US010411550B2

(12) United States Patent
Hiwa et al.

(10) Patent No.: US 10,411,550 B2
(45) Date of Patent: Sep. 10, 2019

(54) MOTOR WITH BRUSH CARD HAVING AN X CAPACITOR AND DOUBLE Y CAPACITORS

(71) Applicant: Nidec Corporation, Minami-ku, Kyoto (JP)

(72) Inventors: Takahiro Hiwa, Kyoto (JP); Shohei Osuga, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 721 days.

(21) Appl. No.: 15/076,932

(22) Filed: Mar. 22, 2016

(65) Prior Publication Data
US 2016/0285340 A1    Sep. 29, 2016

(30) Foreign Application Priority Data
Mar. 26, 2015    (JP) .................. 2015-064246

(51) Int. Cl.
*H02K 11/026* (2016.01)
*H02K 5/14* (2006.01)
(Continued)

(52) U.S. Cl.
CPC ......... *H02K 5/148* (2013.01); *F04D 25/0613* (2013.01); *F04D 29/083* (2013.01); *H02K 11/026* (2013.01); *H02K 5/225* (2013.01)

(58) Field of Classification Search
CPC ............ H02K 5/24; H02K 5/148; H02K 5/02; H02K 5/024; H02K 5/026; H02K 5/14;
(Continued)

(56) References Cited

U.S. PATENT DOCUMENTS

| 5,196,750 A | 3/1993 | Strobl |
| 5,949,173 A * | 9/1999 | Wille .................. H01R 39/381 |
| | | 310/220 |

(Continued)

FOREIGN PATENT DOCUMENTS

| JP | S50049606 U1 | 5/1975 |
| JP | 2511194 Y | 9/1996 |

(Continued)

OTHER PUBLICATIONS

JP2010057298A English Translation, Published 2010, already in IDS.*

(Continued)

*Primary Examiner* — Quyen P Leung
*Assistant Examiner* — Maged M Almawri
(74) *Attorney, Agent, or Firm* — Cantor Colburn LLP

(57) ABSTRACT

A motor includes a rotor, a brush card assembly arranged to supply an electric current to the rotor, a housing, a permanent magnet, and a bearing. The rotor includes a core fixed to a shaft, a coil arranged to excite the core and a commutator connected to the coil. The coil is wound around the core in a concentrated winding method. The brush card assembly includes at least one pair of brushes having different polarities, the brushes disposed along a circumferential direction and connected to each other via the commutator and the coil, a X capacitor parallel-connected to the brushes, Y capacitors parallel-connected to the brushes and a brush card arranged to hold the brushes, the X capacitor and the Y capacitors. The brush card includes a ground portion. The X capacitor is positioned between the brushes in the circumferential direction. The Y capacitors are connected to the ground portion.

19 Claims, 18 Drawing Sheets

(51) Int. Cl.
    *F04D 25/06* (2006.01)
    *F04D 29/08* (2006.01)
    *H02K 5/22* (2006.01)

(58) Field of Classification Search
    CPC .. H02K 13/00; H02K 13/006; H02K 2213/03; H02K 11/026; F04D 29/083; F04D 25/0613
    USPC ...... 310/68 R, 71, 72, 239–253, 68 C, 68 D, 310/148, 151, 51
    See application file for complete search history.

(56) References Cited

U.S. PATENT DOCUMENTS

| | | | |
|---|---|---|---|
| 6,300,696 B1 | 10/2001 | Wong | |
| 6,717,301 B2* | 4/2004 | DeDaran | H02K 11/026 310/68 C |
| 8,829,757 B2 | 9/2014 | Makino | |
| 2009/0058210 A1* | 3/2009 | Qin | H02K 3/28 310/179 |
| 2011/0187225 A1* | 8/2011 | Bayer | H01R 39/385 310/245 |
| 2015/0303777 A1* | 10/2015 | Osborne | H02K 11/026 310/72 |
| 2015/0372560 A1* | 12/2015 | Liang | H02K 5/24 310/71 |
| 2015/0381019 A1* | 12/2015 | Qin | H02K 5/225 310/72 |

FOREIGN PATENT DOCUMENTS

| | | | |
|---|---|---|---|
| JP | 08340654 A | 12/1996 | |
| JP | 09308203 A | 11/1997 | |
| JP | 2000014073 A | 1/2000 | |
| JP | 2007267448 A | 10/2007 | |
| JP | 2008220079 A | 9/2008 | |
| JP | 2009240031 A | 10/2009 | |
| JP | 2010057298 A | 3/2010 | |
| WO | WO-2013175749 A1 * | 11/2013 | ........... H02K 13/006 |

OTHER PUBLICATIONS

JP Office Action corresponding to Application No. 2015-064246; dated Feb. 5, 2019.

* cited by examiner

MOTOR WITH BRUSH CARD HAVING AN X CAPACITOR AND DOUBLE Y CAPACITORS

CROSS REFERENCE TO RELATED APPLICATION

The present invention claims priority under 35 U.S.C. § 119 to Japanese Application No. 2015-064246 filed Mar. 26, 2015, the entire content of which is incorporated herein by reference.

FIELD OF THE INVENTION

At least an embodiment of the present invention relates to a motor and a fan.

BACKGROUND

In the related art, there is known a motor provided with a brush, one example of which is disclosed in Japanese Patent Application Publication No. 2000-14073.

In the motor provided with a brush, when a current is switched, an electromagnetic noise is generated by a spark generated between a brush and a commutator. For that reason, if the motor is installed within, for example, a motor vehicle provided with electronic components, there is a possibility that the electronic components are erroneously operated due to the electromagnetic noise.

In the case where the motor is installed in a position having a limited space, for example, within a motor vehicle, if the installation space of the motor is large, the installation space of other components becomes small. Thus, a demand has existed for the size reduction of a motor.

SUMMARY

According to one exemplary embodiment of the present invention, there is provided a motor which has a structure capable of achieving size reduction and suppressing generation of an electromagnetic noise, and a fan provided with the motor.

The above and other elements, features, steps, characteristics and advantages of the present invention will become more apparent from the following detailed description of the embodiments made with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
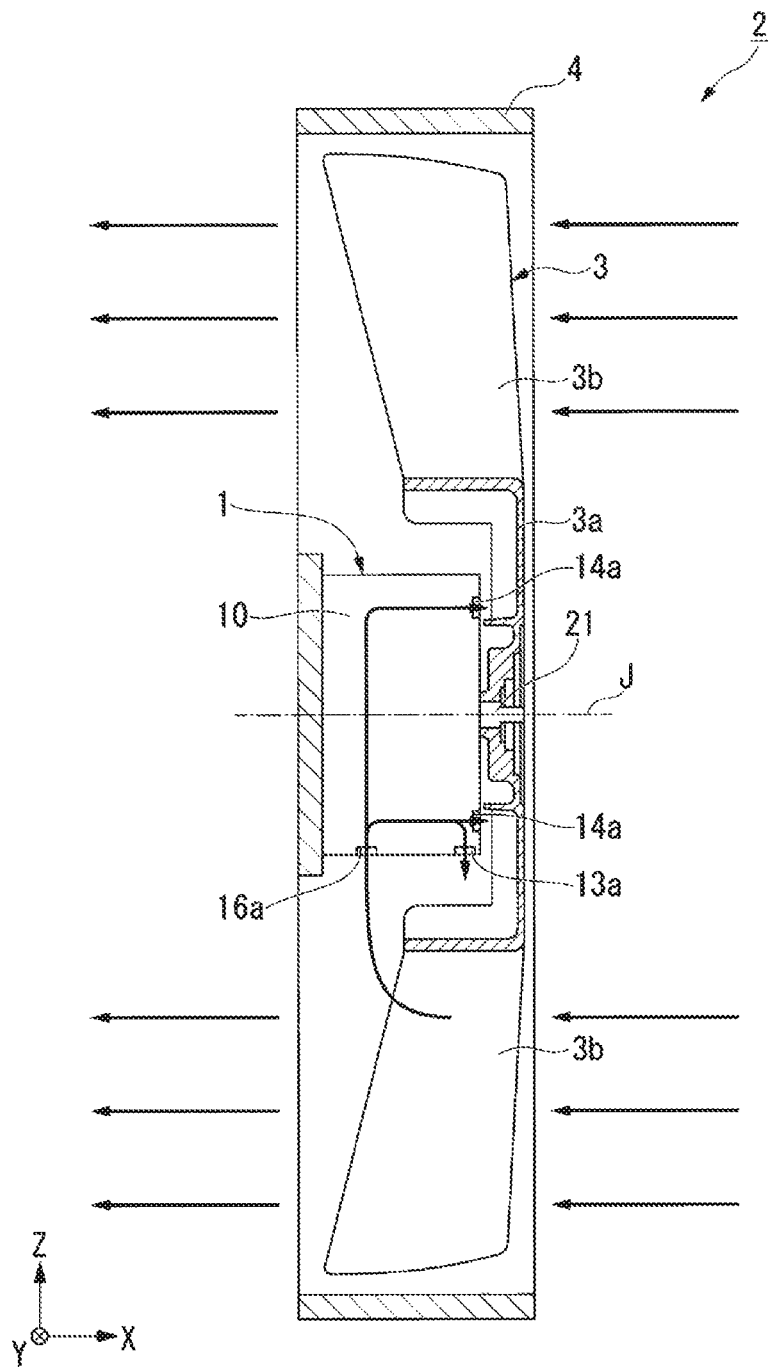
FIG. 1 is a schematic sectional view illustrating a fan according to one embodiment.

Hereinafter, a fan and a motor according to one exemplary embodiment of the present invention will now be described with reference to the accompanying drawings which form a part hereof. The scope of the present invention is not limited to the embodiment described below but may be arbitrarily changed without departing from the scope of the technical idea of the present invention. In the drawings referred to below, for the sake of making individual configurations easily understandable, individual structures are sometimes shown in the reduced scale and number differing from those of actual structures.

Furthermore, in the drawings, an XYZ coordinate system is appropriately shown as a three-dimensional rectangular coordinate system. In the XYZ coordinate system, the X-axis direction is a direction parallel to the axial direction of a center axis J illustrated in FIG. 1. The Z-axis direction is an up-down direction. The Y-axis direction is a direction orthogonal to both the X-axis direction and the Z-axis direction.

In the following description, the positive side (the +X side or one side) in the X-axis direction will be referred to as a "front side". The negative side (the −X side) in the X-axis direction will be referred to as a "rear side". The positive side (the +Z side) in the Z-axis direction will be referred to as an "upper side". The negative side (the −Z side) in the Z-axis direction will be referred to as a "lower side". The terms "front side", "rear side", "upper side" and "lower side" are used merely for the purpose of descriptions and are not intended to limit the actual positional relationships or the actual directions. Unless specifically mentioned otherwise, the direction (the X-axis direction) parallel to the center axis J will be merely referred to as an "axial direction". The radius direction about the center axis J extending in the up-down direction (the Z-axis direction) will be merely referred to as a "radial direction". The circumference direction about the center axis J, namely the direction extending around the center axis J, will be merely referred to as a "circumferential direction"

In the subject specification, the phrase "extending in the axial direction" includes not only a case where something extends strictly in the axial direction (the X-axis direction)

but also a case where something extend in a direction inclined at an angle of less than 45 degrees with respect to the axial direction.

Furthermore, in the subject specification, the phrase "extending in the radial direction" includes not only a case where something extends strictly in the radial direction, namely in the direction perpendicular to the axial direction (the X-axis direction) but also a case where something extend in a direction inclined at an angle of less than 45 degrees with respect to the radial direction.

<Fan>

FIG. 1 is a schematic sectional view illustrating a fan 2 according to one embodiment. In FIG. 1, the flow of an air is indicated by thick arrows. The fan 2 according to one embodiment may be, for example, an engine cooling fan for cooling an engine of a motor vehicle. As illustrated in FIG. 1, the fan 2 preferably includes a motor 1, an impeller 3 and a shroud 4.

The impeller 3 is mounted to a shaft 21 of the motor 1 will be described later. The impeller 3 preferably includes an impeller cup 3a and a plurality of moving blades 3b. The impeller cup 3a is fixed to the motor 1. More specifically, the impeller cup 3a is fixed to the front side (+X side) end portion of the shaft 21. The impeller cup 3a has a cylindrical shape opened toward the rear side (−X side). The impeller cup 3a covers the front side (+X side) of the motor 1.

The moving blades 3b are fixed to the outer circumferential surface of the impeller cup 3a. While not shown in the drawings, the moving blades 3b are provided along the circumferential direction.

The motor 1 is fixed to the shroud 4. While not shown in the drawings, the shroud 4 is formed in a frame-like shape so as to surround the motor 1 and the radial outer side of the impeller 3.

As the shaft 21 of the motor 1 rotates, the impeller 3 rotates about the center axis J. Thus, an air is drawn from the front side (+X side) of the impeller 3 and is discharged toward the rear side (−X side) of the impeller 3. As a result, the fan 2 blows the air toward the rear side.

<Motor>

Figure 2:
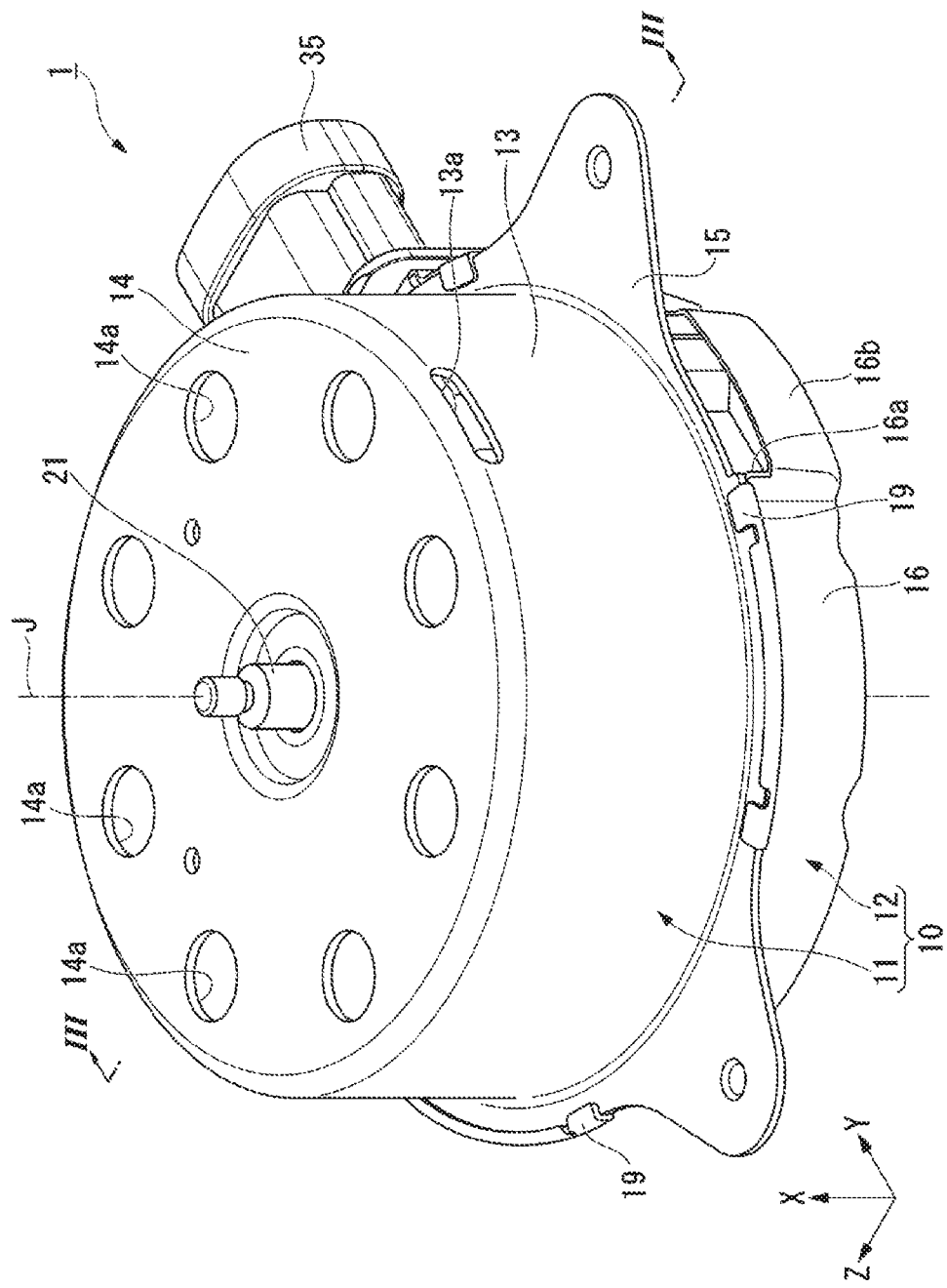
FIG. 2 is a perspective view illustrating a motor according to one embodiment.
Figure 3:
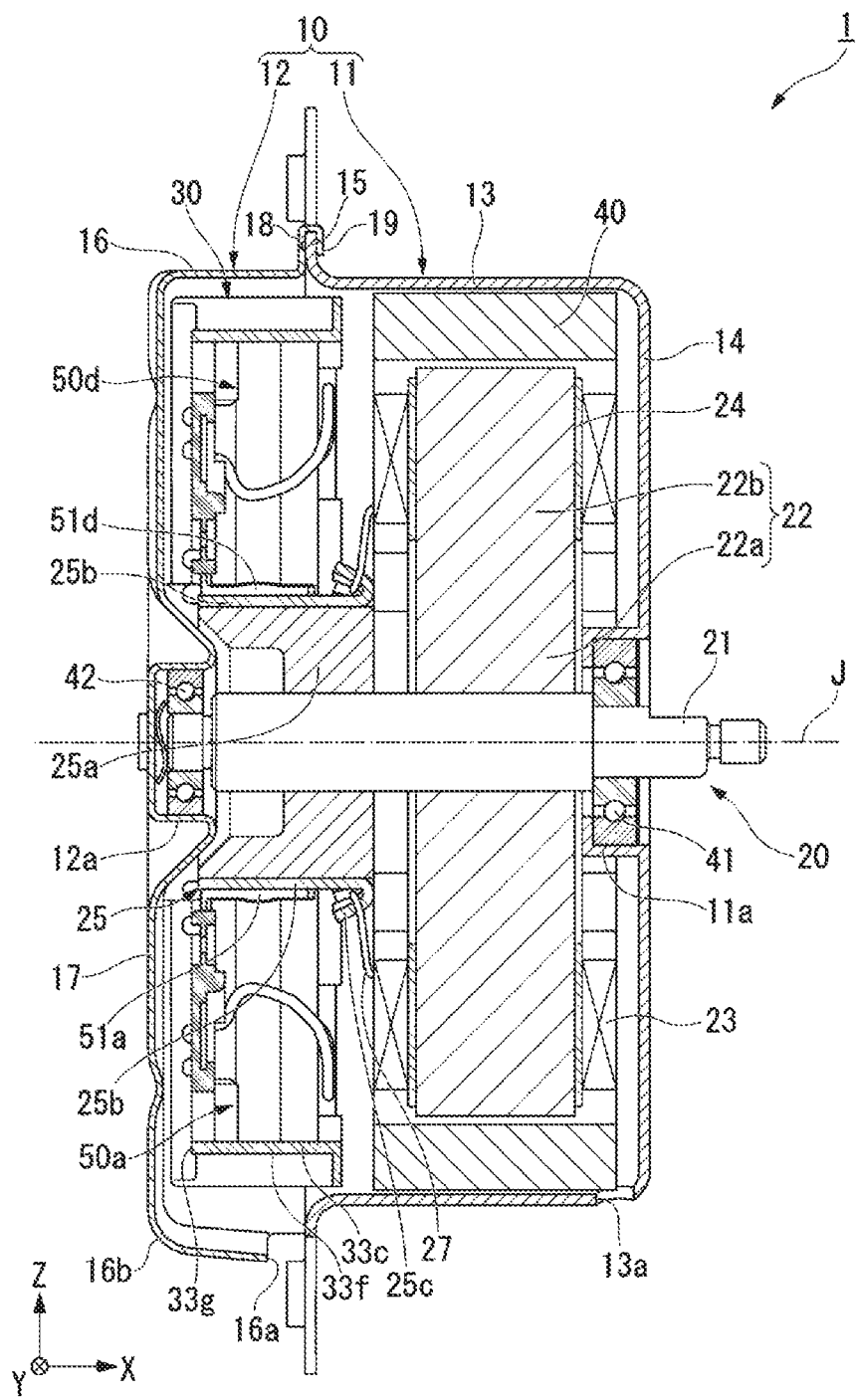
FIG. 3 is a sectional view taken along line which illustrates the motor according to one embodiment.
Figure 4:
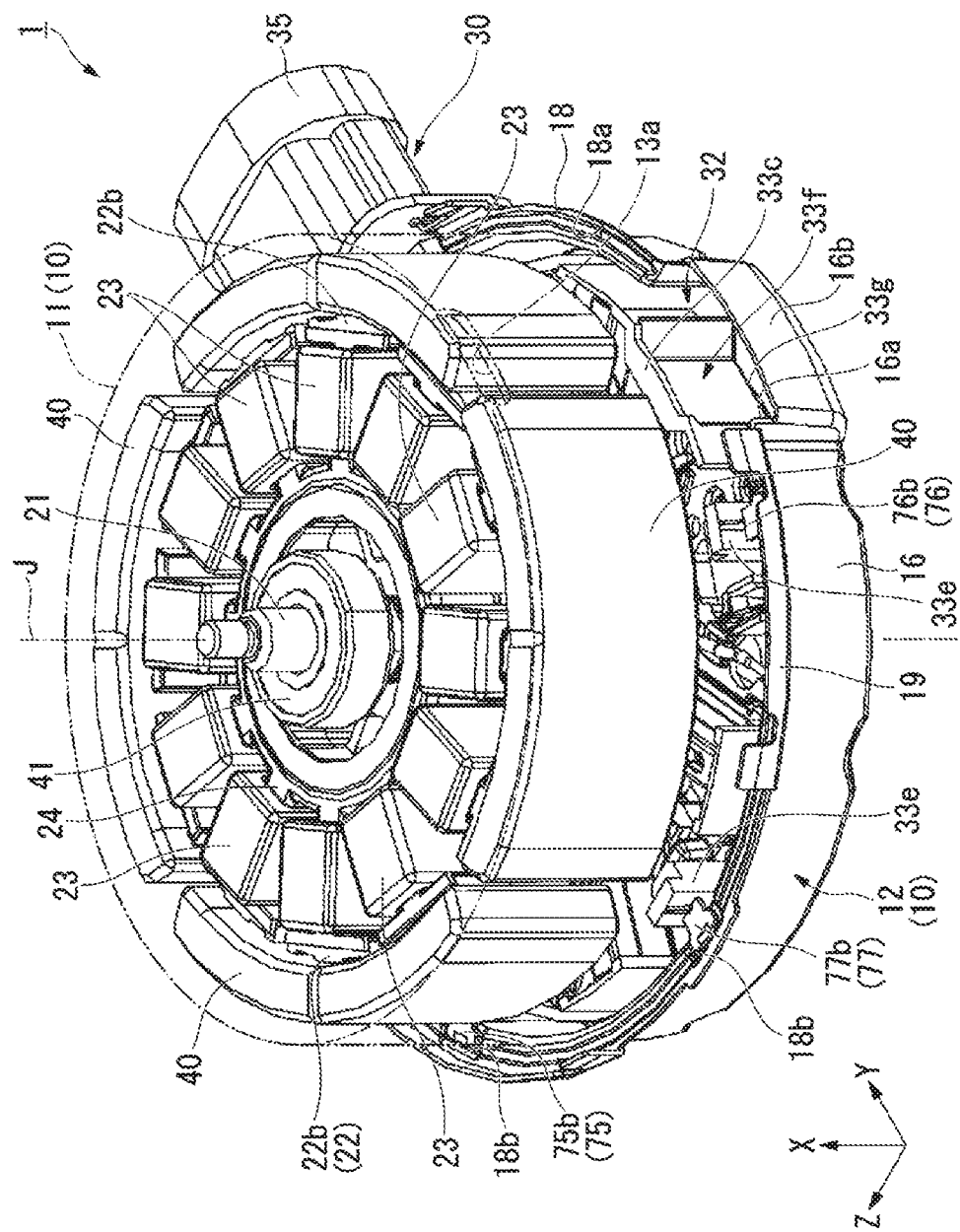
FIG. 4 is a perspective view illustrating the motor according to one embodiment.

FIGS. 2 to 4 are views illustrating the motor 1 according to one embodiment. FIGS. 2 to 4 are perspective views. FIG. 3 is a sectional view taken along line in FIG. 2. FIG. 4 illustrates the motor 1 with a bracket 11 removed.

The motor 1 according to one embodiment is a brush motor provided with a brush. As illustrated in FIGS. 2 and 3, the motor 1 preferably includes a housing 10, a rotor 20, permanent magnets 40, a front bearing 41, a rear bearing 42 and a brush card assembly 30. As illustrated in FIG. 4, the brush card assembly 30 preferably includes a connector portion 35 to which an external power source is connected. That is to say, the motor 1 is provided with the connector portion 35.

<Housing>

The housing 10 accommodates the rotor 20 and the brush card assembly 30. As illustrated in FIG. 2, the housing 10 preferably includes a bracket 11 and a back cover 12. The housing 10 is made of, for example, carbon steel such as S45C (JIS G 4051: 2009) or the like.

In the subject specification, the expression "a certain component accommodates a certain object" includes not only a case where the entirety of a certain object is positioned inside a certain component but also a case where a portion of a certain object is positioned outside a certain component. For example, the expression "the housing 10 accommodates the brush card assembly 30" includes a case where a portion of the brush card assembly 30 is positioned outside the housing 10. As illustrated in FIGS. 2 and 3, the motor 1 is mounted to an actual machine so that a bracket through-hole 13a to be described later faces toward the lower side (−Z side) in the vertical direction. However, the mounting direction of the motor 1 is not limited thereto.

<Bracket>

The bracket 11 is positioned at the front side (+X side) of the back cover 12. The bracket 11 preferably includes a bracket tube portion (tube portion) 13, a front flat portion 14 and a bracket flange portion 15. That is to say, the housing 10 includes the bracket tube portion 13.

As illustrated in FIG. 3, the bracket tube portion 13 surrounds the radial outer side of the rotor 20. That is to say, the bracket 11 holds the permanent magnets 40. The permanent magnets 40 are fixed to the inner surface of the bracket tube portion 13. As illustrated in FIG. 2, in the present embodiment, the bracket tube portion 13 is formed in, e.g., a cylindrical shape, in a concentric relationship with the center axis J.

A bracket through-hole (housing through-hole) 13a extending through the bracket tube portion 13 in the radial direction is provided in the bracket tube portion 13. Since the bracket through-hole 13a is oriented in the vertical direction, water droplets infiltrated into the bracket 11 are gathered in the bracket through-hole 13a and are discharged to the outside of the housing 10 via the bracket through-hole 13a.

As illustrated in FIG. 4, the bracket through-hole 13a is positioned between the connector portion 35 and a below-mentioned ground portion 76 in the circumferential direction. As illustrated in FIG. 3, in the present embodiment, the bracket through-hole 13a is provided at the lower end of the front side (+X side) end portion of the bracket tube portion 13. As illustrated in FIG. 2, the bracket through-hole 13a is, for example, a slit extending in the circumferential direction. By forming the bracket through-hole 13a to extend in the circumferential direction, the mounting position of the motor 1 can be moved in the circumferential direction within an extent that the bracket through-hole 13a is oriented in the vertical direction.

The front flat portion 14 is connected to the front side (+X side) end portion of the bracket tube portion 13. The shape of the front flat portion 14 viewed from the front side (+X side) is, for example, a circular shape concentric with the center axis J. A plurality of front side hole portions 14a extending through the front flat portion 14 in the axial direction (X-axis direction) is provided in the front flat portion 14. The front side hole portions 14a are disposed in a mutually spaced-apart relationship along the circumferential direction.

As illustrated in FIG. 3, a front side bearing holding portion 11a is provided in the front flat portion 14. The front side bearing holding portion 11a is a portion where the central region of the front flat portion 14 is depressed toward the rear side (−X side). The front bearing 41 is held at the radial inner side of the front side bearing holding portion 11a.

The bracket flange portion 15 extends radially outward from the rear side (−X side) end portion of the bracket tube portion 13. The motor 1 is mounted to the shroud of the fan or the like by, for example, fixing the bracket flange portion 15.

<Back Cover>

The back cover 12 is mounted to the rear side (−X side) of the bracket 11. The back cover 12 holds the brush card assembly 30. The back cover 12 preferably includes a back cover tube portion (tube portion) 16, a rear flat portion 17 and a back cover flange portion 18. That is to say, the housing 10 includes the back cover tube portion 16.

The back cover tube portion 16 surrounds the radial outer side of the rotor 20. As illustrated in FIG. 4, in the present embodiment, the back cover tube portion 16 is formed in, for example, a substantially cylindrical shape, in a concentric relationship with the center axis J. The back cover tube portion 16 preferably includes an expansion portion 16*b* expanded radially outward.

As illustrated in FIG. 2, as the bracket 11 is mounted to the front side (+X side) of the back cover 12, a back cover through-hole (housing through-hole) 16*a* is provided between the expansion portion 16*b* and the rear side (−X side) end portion of the bracket tube portion 13. The expansion portion 16*b* is vertically extended and the back cover through-hole 16*a* radially extends through the bracket tube portion 13. Thus, water droplets infiltrated into the back cover 12 are gathered in the expansion portion 16*b* and are discharged to the outside of the housing 10 via the back cover through-hole 16*a*.

When the fan 2 blows an air toward the rear side (−X side) as illustrated in FIG. 1, there may be a case where a part of the air drawn from the front side (+X side) toward the impeller 3 is introduced into the motor 1 via, for example, the back cover through-hole 16*a*. The air introduced into the motor 1 moves from the rear side toward the front side within the motor 1. The air is discharged to the outside of the motor 1 from the front side hole portions 14*a* or the bracket through-hole 13*a*. By providing the bracket through-hole 13*a*, the front side hole portions 14*a* and the back cover through-hole 16*a* in the housing 10 as mentioned above, it is possible to allow the air to flow through the interior of the motor 1. This makes it possible to cool the motor 1.

In particular, due to the friction between brushes 51*a* to 51*d* and a commutator 25 which will be described later, the brushes 51*a* to 51*d* and the commutator 25 tend to become hot. According to the present embodiment, by allowing the air to flow through the interior of the motor 1, it is possible to cool the brushes 51*a* to 51*d*, the commutator 25, the rotor 20, the permanent magnets 40 and the electronic components (an X capacitor 60, Y capacitors 61 and 62, etc.) mounted to a plate portion 70 of a brush card 31.

As illustrated in FIG. 4, the back cover through-hole 16*a* is positioned between the connector portion 35 and a below-described ground portion 76 in the circumferential direction. As illustrated in FIG. 3, the back cover through-hole 16*a* is positioned in the lower side (−Z side) end portion of the housing 10.

The rear flat portion 17 is connected to the rear side (−X side) end portion of the back cover tube portion 16. While not shown in the drawings, the shape of the rear flat portion 17 viewed from the rear side (−X side) is, for example, a circular shape concentric with the center axis J. A rear side bearing holding portion 12*a* is provided in the central region of the rear flat portion 17. The rear bearing 42 is held at the radial inner side of the rear side bearing holding portion 12*a*.

The back cover flange portion 18 extends radially outward from the front side (+X side) end portion of the back cover tube portion 16. As illustrated in FIG. 4, a groove 18*a* is provided on the front side (+X side) surface of the back cover flange portion 18. In other words, the groove 18*a* is provided in the housing 10. The groove 18*a* extends from the connector portion 35 to the back cover through-hole 16*a* along the circumferential direction. Thus, water droplets infiltrated from the connector portion 35 into the housing 10 flows toward the back cover through-hole 16*a* along the groove 18*a*. As a result, the water droplets are discharged to the outside of the housing 10 via the back cover through-hole 16*a*.

A ground receiving portion 18*b* is provided on the front side (+X side) surface of the back cover flange portion 18. Contact portions 75*b*, 76*b* and 77*b* of ground portions 75, 76 and 77 to be described later are provided in the ground receiving portion 18*b*.

A caulking fixing portion 19 is connected to the radial outer end portion of the back cover flange portion 18. As illustrated in FIG. 2, the caulking fixing portion 19 is caulked radially inward. As illustrated in FIG. 3, the bracket flange portion 15 is sandwiched between the caulking fixing portion 19 and the back cover flange portion 18. Thus, the bracket 11 and the back cover 12 are fixed to each other. In other words, the bracket 11 and the back cover 12 are fixed by caulking.

Figure 5:
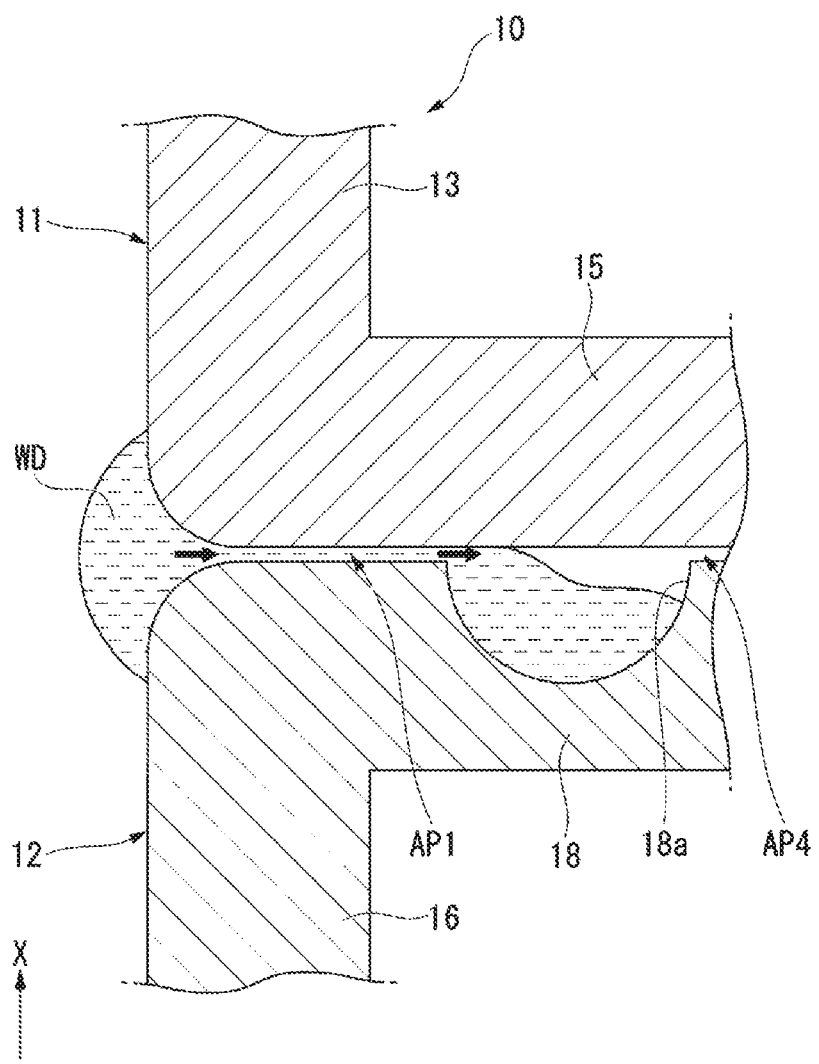
FIG. 5 is an enlarged sectional view illustrating a portion of a housing according to one embodiment.

FIG. 5 is an enlarged sectional view illustrating a portion where the bracket 11 and the back cover 12 are fixed to each other. As illustrated in FIG. 5, a minute gap AP1, which interconnects the radial inner side of the housing 10 and the groove 18*a* of the back cover flange portion 18, exists between the bracket flange portion 15 and the back cover flange portion 18 in the axial direction (X-axis direction).

Thus, water droplets WD infiltrated into the housing 10 are introduced from the gap AP1 into the groove 18*a* by a capillary phenomenon. Consequently, the water droplets WD infiltrated into the housing 10 are gathered in the groove 18*a*. As a result, the water droplets WD infiltrated into the housing 10 are easily discharged from the groove 18*a* to the outside of the housing 10 via the back cover through-hole 16*a*.

Furthermore, a gap AP4 opened to the outside of the housing 10 is defined between the bracket flange portion 15 and the back cover flange portion 18 in the axial direction. There may be case where water droplets existing outside the housing 10 try to enter the interior of the housing 10 via the gap AP4. Even in this case, the water droplets infiltrated from the outside of the housing 10 to the gap AP4 are gathered in the groove 18*a* and are discharged to the outside of the housing 10. Thus, according to the present embodiment, it is possible to restrain water droplets existing outside the housing 10 from entering the interior of the housing 10.

<Rotor>

As illustrated in FIG. 3, the rotor 20 preferably includes a shaft 21, a core 22, coils 23, an insulator 24 and a commutator 25.

The shaft 21 is concentric with the center axis J extending in the axial direction (X-axis direction). The front side (+X side) end portion of the shaft 21 is exposed to the outside of the housing 10.

The core 22 is fixed to the shaft 21. The core 22 is positioned radially inward of the bracket 11. The core 22 is radially opposed to the permanent magnets 40. The core 22 preferably includes a core back 22*a* and a plurality of teeth 22*b*.

The core back 22*a* has, for example, an annular shape concentric with the center axis J. The core back 22*a* is fitted to the radial outer side of the shaft 21. The teeth 22*b* extend radially outward from the radial outer surface of the core back 22*a*. The teeth 22*b* are disposed at regular intervals along the circumferential direction.

The coils 23 excite the core 22. As illustrated in FIG. 4, the coils 23 are wound around the teeth 22*b* with the insulator 24 interposed therebetween. The coils 23 are wound on the core 22 in concentrated windings. Therefore, as compared with a case where the coils 23 are wound in distributed windings, it is possible to reduce the axial (X-axis direction) dimension or the radial dimension of the coils 23 as a whole. This makes it possible to reduce the size of the motor 1. Since the windings of the coils 23 can be made short, it is possible to reduce the loss attributable to the resistance of the windings.

As illustrated in FIG. 3, the commutator 25 is positioned at the rear side (−X side) of the core 22. The commutator 25 preferably includes an insulating member 25a and a plurality of segments 25b. The insulating member 25a is a member having an insulating property. The insulating member 25a is formed in, e.g., a cylindrical shape, so as to surround the radial outer side of the shaft 21. The insulating member 25a is fitted to the outer circumferential surface of the shaft 21.

The segments 25b are fixed to the outer surface of the insulating member 25a. The segments 25b are disposed at regular intervals along the circumferential direction. The segments 25b are conductors extending in the axial direction (X-axis direction). Each of the segments 25b preferably includes a hook 25c formed in the front side (+X side) end portion thereof. A coil wiring line 27 is held in the hook 25c. The coil wiring line 27 is electrically connected to each of the coils 23. Thus, each of the segments 25b, namely the commutator 25, is electrically connected to each of the coils 23.

The coil wiring line 27 may be a portion of the windings that constitute the coils 23 or may be a member differing from the windings that constitute the coils 23.

The radial outer surfaces of the segments 25b are capable of making contact with the brushes 51a to 51d which will be described later. The segments 25b that make contact with the brushes 51a to 51d are changed depending on the rotation of the rotor 20.

<Permanent Magnet>

The permanent magnets 40 are fixed to the inside of the housing 10. The permanent magnets 40 are positioned at the radial outer side of the rotor 20. As illustrated in FIG. 4, the permanent magnets 40 are formed in, e.g., an arc shape, so as to extend in the circumferential direction. For example, four permanent magnets 40 are provided along the circumferential direction. Each of the permanent magnets 40 has two magnetic poles disposed in the circumferential direction. Thus, the number of poles of the permanent magnets 40 is, e.g., eight. The number of poles of the permanent magnets 40 is not particularly limited.

<Front Bearing and Rear Bearing>

The front bearing 41 and the rear bearing 42 support the shaft 21. As illustrated in FIG. 3, the front bearing 41 is positioned at the front side (+X side) of the core 22. The front bearing 41 is held by the housing 10. More specifically, the front bearing 41 is held by the front bearing holding portion 11a of the bracket 11.

The rear bearing 42 is positioned at the rear side (−X side) of the commutator 25. The rear bearing 42 is held by the housing 10. More specifically, the rear bearing 42 is held by the rear bearing holding portion 12a of the back cover 12.

<Brush Card Assembly>

The brush card assembly 30 is positioned at the rear side (−X side) of the core 22 of the rotor 20. The brush card assembly 30 surrounds the radial outer side of the commutator 25 of the rotor 20. The brush card assembly 30 supplies an electric current to the rotor 20 via the commutator 25.

Figure 6:
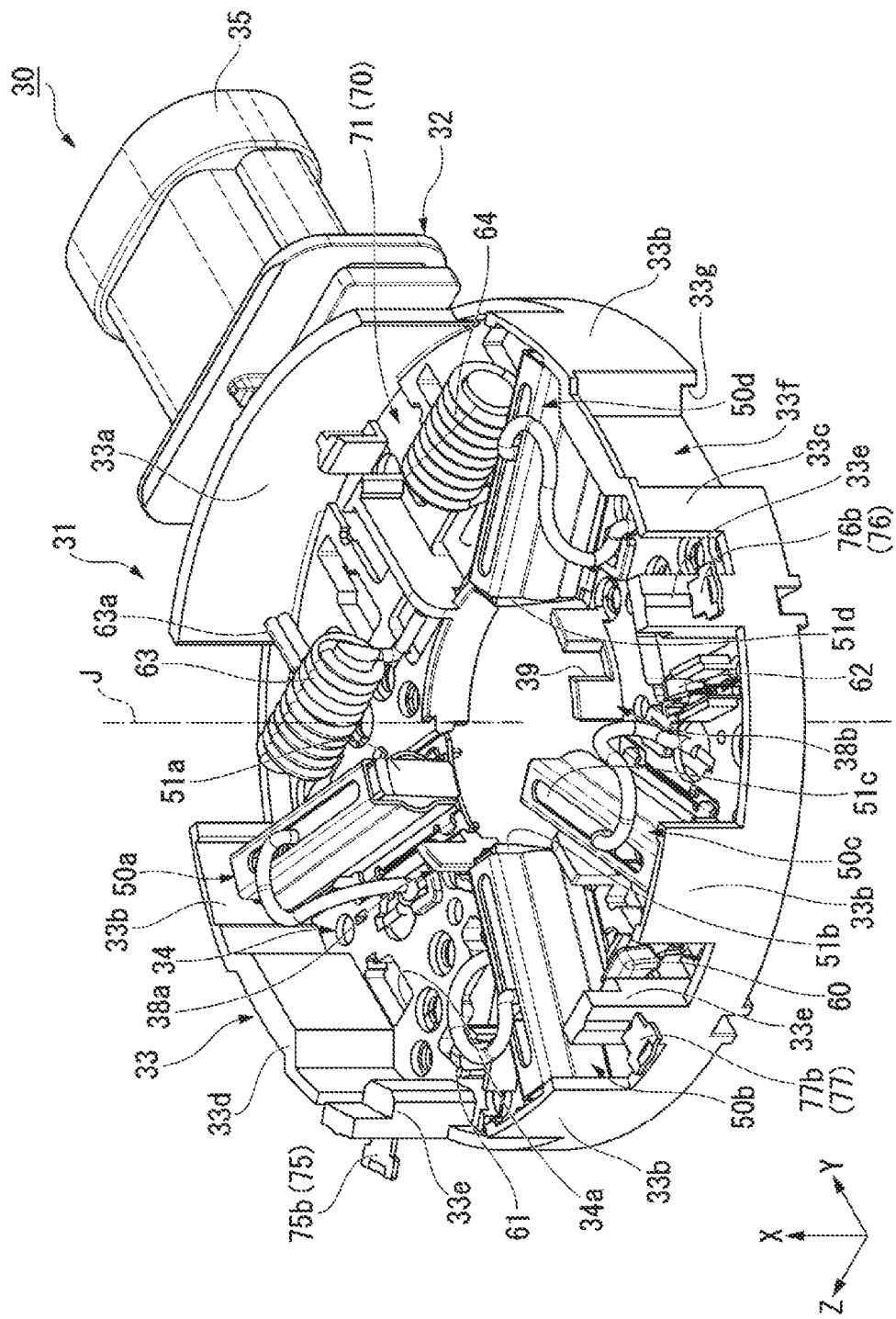
FIG. 6 is a perspective view illustrating a brush card assembly according to one embodiment.
Figure 7:
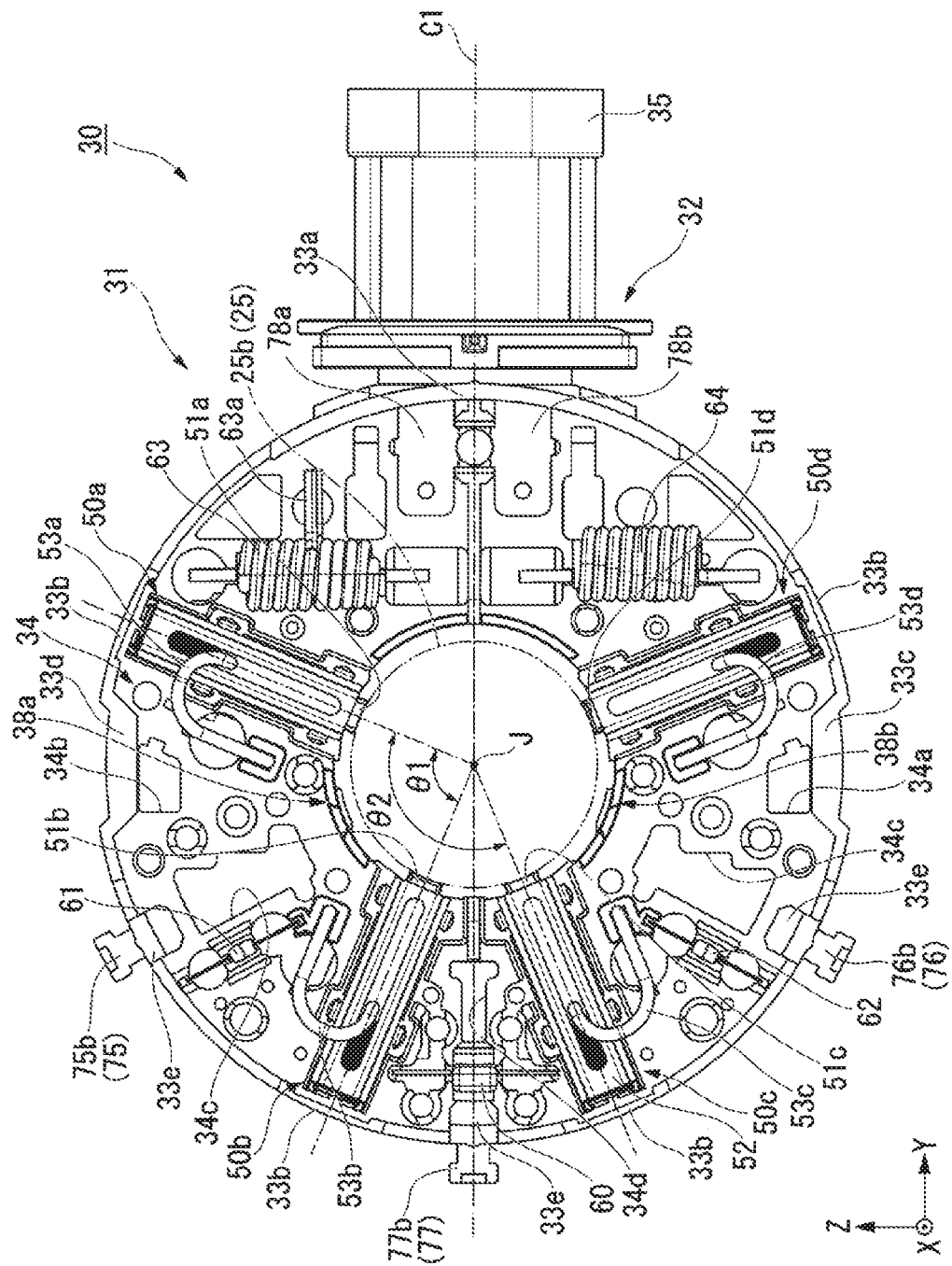
FIG. 7 is a front view illustrating the brush card assembly according to one embodiment.
Figure 8:
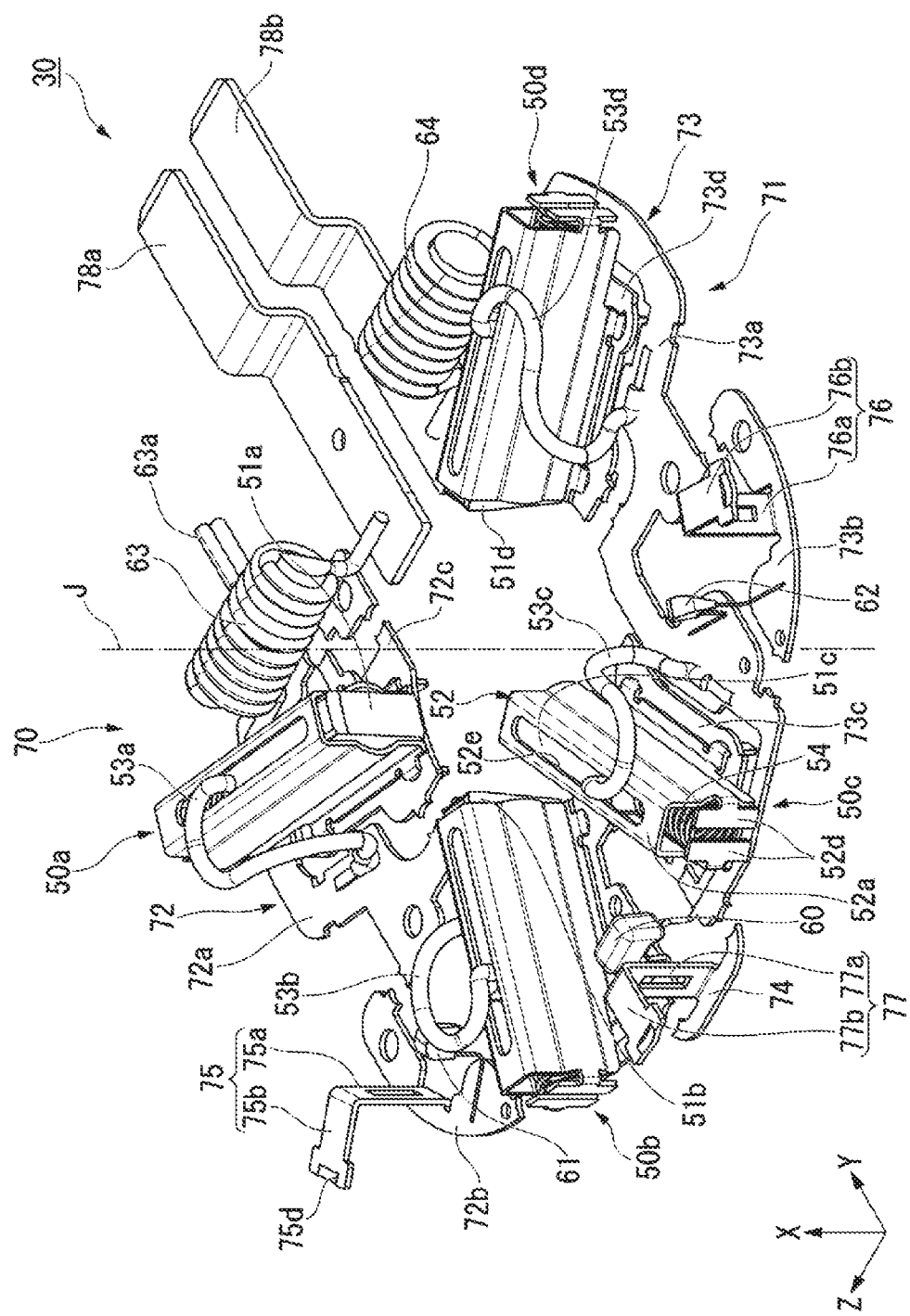
FIG. 8 is a perspective view illustrating the brush card assembly according to one embodiment.
Figure 9:
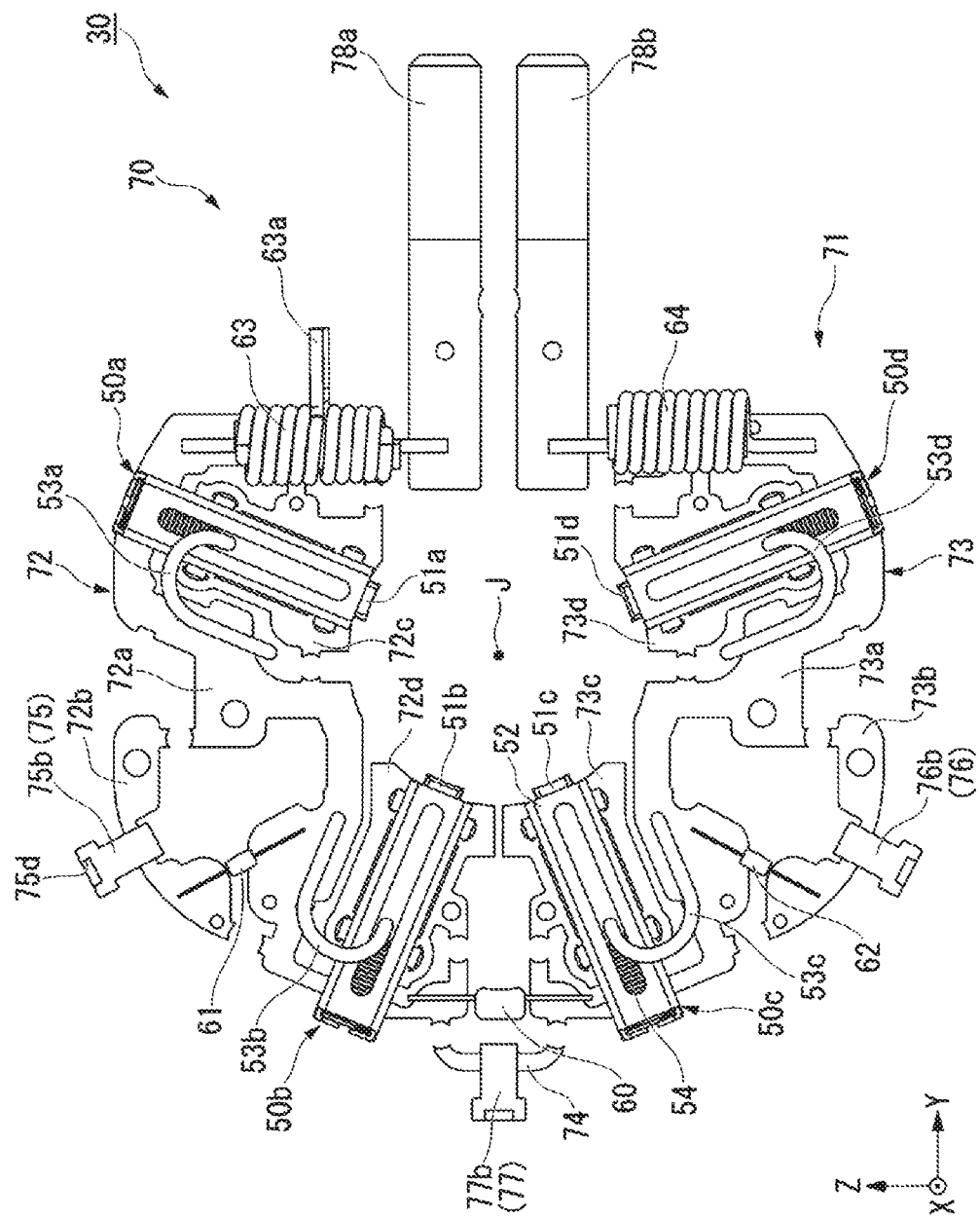
FIG. 9 is a front view illustrating the brush card assembly according to one embodiment.

FIGS. 6 to 9 are views illustrating the brush card assembly 30. FIGS. 6 and 8 are perspective views. FIGS. 7 and 9 are front views of the brush card assembly 30 viewed from the front side (+X side). In FIGS. 8 and 9, a resin portion 32 of a brush card 31 is omitted.

As illustrated in FIGS. 6 and 7, the brush card assembly 30 preferably includes a brush card 31, brush units 50a, 50b, 50c and 50d, an X capacitor 60, Y capacitors 61 and 62, and choke coils 63 and 64. The brush unit 50a includes a brush 51a. The brush unit 50b includes a brush 51b. The brush unit 50c includes a brush 51c. The brush unit 50d includes a brush 51d.

The brush units 50a to 50d, the X capacitor 60, the Y capacitors 61 and 62 and the choke coils 63 and 64 are mounted on the brush card 31. More specifically, the brush units 50a to 50d, the X capacitor 60, the Y capacitors 61 and 62 and the choke coils 63 and 64 are mounted on a plate portion 70 of the brush card 31. As a method of mounting the respective components to the plate portion 70, it may be possible to employ, for example, a method of fixing a portion of each of the components to the plate portion 70 by caulking the same or a method of fixing the components to the plate portion 70 by welding.

A circuit is formed by the plate portion 70 and the respective components mounted on the plate portion 70. Thus, an electric current is supplied to the rotor 20. The respective components of the brush card assembly 30 will now be described in detail.

<Brush Card>

The brush card 31 holds the brushes 51a to 51d, the X capacitor 60 and the Y capacitors 61 and 62. As illustrated in FIG. 6, the brush card 31 preferably includes a plate portion 70 and a resin portion 32. The brush card 31 is manufactured by, for example, an insert molding method in which the plate portion 70 is inserted into a mold. This makes it easy to manufacture the brush card 31.

<Plate Portion>

The plate portion 70 is a conductor that electrically interconnects the brushes 51a to 51d, the X capacitor 60 and the Y capacitors 61 and 62. The plate portion 70 is made of, e.g., brass or copper. Thus, it is possible to prevent electric corrosion in the case where the wiring lines and members connected to the plate portion 70 are made of, e.g., copper.

As illustrated in FIGS. 8 and 9, the plate portion 70 preferably includes a plate body portion 71, ground portions 75, 76 and 77, a negative-electrode-side connection terminal 78a and a positive-electrode-side connection terminal 78b. That is to say, the brush card 31 includes the ground portions 75 to 77.

The plate body portion 71 preferably includes a negative-electrode-side body portion 72, a positive-electrode-side body portion 73 and a ground support portion 74. The negative-electrode-side body portion 72 preferably includes a negative-electrode-side wiring portion 72a, a negative-electrode-side ground support portion 72b and brush unit installation portions 72c and 72d. The positive-electrode-side body portion 73 preferably includes a positive-electrode-side wiring portion 73a, a positive-electrode-side ground support portion 73b and brush unit installation portions 73c and 73d.

The negative-electrode-side wiring portion 72a is connected to the negative-electrode-side connection terminal 78a by the choke coil 63. The positive-electrode-side wiring portion 73a is connected to the positive-electrode-side connection terminal 78b by the choke coil 64. The negative-electrode-side wiring portion 72a and the positive-electrode-side wiring portion 73a are connected by the X capacitor 60.

The negative-electrode-side ground support portion 72b is connected to the negative-electrode-side wiring portion 72a by the Y capacitor 61. The positive-electrode-side ground support portion 73b is connected to the positive-electrode-side wiring portion 73a by the Y capacitor 62.

The brush unit 50a is installed in the brush unit installation portion 72c. The brush unit 50b is installed in the brush unit installation portion 72d. The brush unit 50c is installed in the brush unit installation portion 73c. The brush unit 50d is installed in the brush unit installation portion 73d.

The brush unit installation portion 72c is electrically connected to the negative-electrode-side wiring portion 72a via the brush unit 50a. The brush unit installation portion 72d is electrically connected to the negative-electrode-side wiring portion 72a via the brush unit 50b. The brush unit installation portion 73c is electrically connected to the positive-electrode-side wiring portion 73a via the brush unit 50c. The brush unit installation portion 73d is electrically connected to the positive-electrode-side wiring portion 73a via the brush unit 50d.

Figure 10:
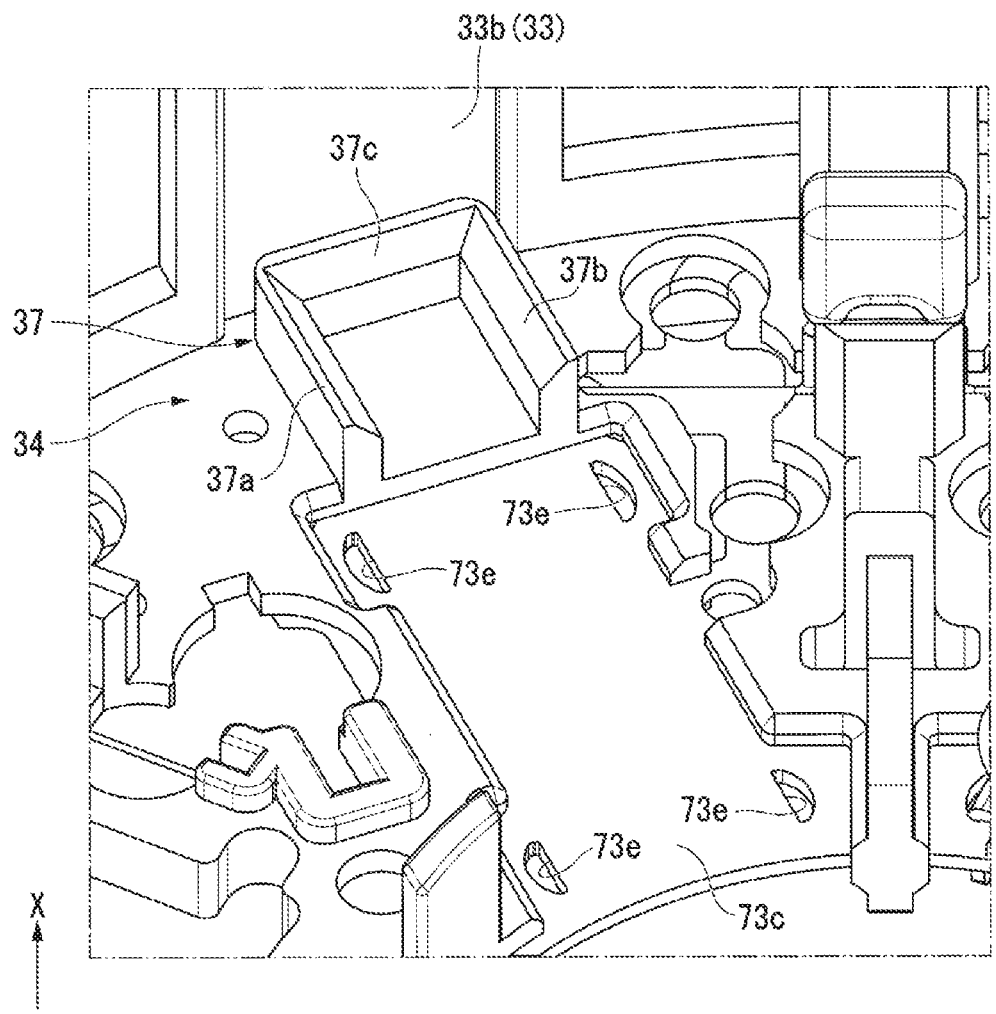
FIG. 10 is a perspective view illustrating a portion of the brush card assembly according to one embodiment.

FIG. 10 is a perspective view illustrating the brush unit installation portion 73c. As illustrated in FIG. 10, mounting hole portions 73e extending through the brush unit installation portion 73c in the axial direction (X-axis direction) are provided in the brush unit installation portion 73c. Mounting leg portions 52c of a brush case 52 to be described later are inserted into the mounting hole portions 73e. For example, four mounting hole portions 73e are provided. The shape of the mounting hole portions 73e viewed from the front side (+X side) is, for example, a semi-elliptical shape.

Thus, it is possible to accurately position the brush case 52, namely the brush unit 50c, by aligning the mounting leg portions 52c with the linear contour sections of the mounting hole portions 73e. As a result, it is possible to accurately dispose the brush 51c. Even when a design error is generated in the dimension of the mounting leg portions 52c, it is easy to bring the mounting leg portions 52c into contact with some points of the arc sections of the mounting hole portions 73e. Thus, the mounting leg portions 52c can be stably supported by the inner edges of the mounting hole portions 73e. As a result, it is possible to strongly fix the brush unit 50c.

Since the commutator 25 rotates in a state in which the brush 51c is brought into contact with the commutator 25, the brush 51c is easy to become hot due to the friction between the brush 51c and the commutator 25. If the brush 51c becomes hot, the brush unit installation portion 73c is easy to become hot due to the heat of the brush 51c. Thus, if the brush unit installation portion 73c is made of, e.g., a resin, the brush unit installation portion 73c is easily melted or deformed. For that reason, there is a possibility that the positioning accuracy of the brush unit 50c is sharply reduced.

In contrast, according to the present embodiment, the plate portion 70, namely the brush unit installation portion 73c, is made of brass or copper as described above. Thus, even when the brush unit installation portion 73c becomes hot, it is possible to restrain the brush unit installation portion 73c from being melted or deformed. Therefore, according to the present embodiment, it is possible to suppress reduction of the positioning accuracy of the brush unit 50c.

Brass or copper is higher in heat conductivity than a resin. For that reason, the heat of the brush 51c is easily dissipated via the brush unit installation portion 73c. Thus, the brush 51c is easily cooled. This characteristic is very effective in the case where the motor 1 is a motor used in a device, such as an engine cooling fan or the like, which is required to rotate for a long period of time.

For example, in the case where a resin-made portion is disposed in the commutator-side end portion of the brush unit installation portion 73c, the resin-made portion is easily melted or deformed by the heat of the brush 51c or the heat of the brush unit installation portion 73c. For that reason, there is a possibility that the positioning accuracy of the brush unit 50c is reduced.

In contrast, according to the present embodiment, a resin-made portion is not disposed in the commutator-side end portion of the brush unit installation portion 73c. It is therefore possible to suppress reduction of the positioning accuracy of the brush unit 50c.

While not shown in the drawings, the brush unit installation portions 72c, 72d and 73d are similar to the brush unit installation portion 73c.

As illustrated in FIG. 8, the ground portion 75 is connected to the negative-electrode-side ground support portion 72b of the plate body portion 71. That is to say, the ground portion 75 is connected to the plate body portion 71. As illustrated in FIG. 7, the ground portion 75 is positioned at the opposite side (−Y side) of the center axis J from the connector portion 35. The ground portion 75 is positioned at the upper side (+Z side) of the center axis J. The ground portion 75 is positioned between the brush unit 50a and the brush unit 50b in the circumferential direction. As illustrated in FIG. 8, the ground portion 75 preferably includes an extension portion 75a and a contact portion 75b.

The extension portion 75a is a portion connected to the negative-electrode-side ground support portion 72b. The extension portion 75a extends from the negative-electrode-side ground support portion 72b in the axial direction (X-axis direction). That is to say, the extension portion 75a extends from the plate body portion 71 in the axial direction.

The extension portion 75a is connected to the negative-electrode-side ground support portion 72b at the radial inner edge of the negative-electrode-side ground support portion 72b. That is to say, the ground portion 75 is connected to the plate body portion 71 at the more radial inner side than the outer edge of the plate body portion 71.

Thus, for example, in the case where the plate portion 70 is manufactured by punching a single plate, the ground portion 75 can be formed by bending the portion, which exists more inward than the outer edge of the punched portion, toward the front side (+X side). Therefore, as compared with a case where the ground portion 75 is connected to the outer edge of the plate body portion 71, it is possible to reduce the area of the portion which is punched from a single plate in order to manufacture the plate portion 70. Thus, according to the present embodiment, it is possible to increase the number of plate portions which can be punched from a single plate. This makes it possible to reduce the manufacturing cost of the motor 1. In particular, if the plate portion 70 is made of, e.g., brass as in the present embodiment, the cost tends to become higher. It is therefore possible to further enhance the cost saving effect.

Furthermore, if the ground portion 75 is formed by bending the inner portion of the punched plate as described above, the region from which the ground portion 75 is punched becomes a hole extending through the plate body portion 71 in the axial direction (X-axis direction). Thus, the below-described resin body hole portions 34c and 34d of the brush card 31 can be formed using the punched region of the ground portion 75. This makes it possible to reduce the labor otherwise required when the resin body hole portions 34c and 34d are formed by additionally punching the plate body portion 71. Moreover, if the ground portion 75 is formed by bending the inner portion of the punched plate, the portion wasted after punching the plate is reduced. For example, if the ground portion 75 is formed by punching the outer side of the plate corresponding to the negative-electrode-side ground support portion 72b, the portion of the plate existing around the ground portion 75, which is left after punching, is wasted. As a result, the wasted portion becomes larger and, therefore, the cost of the plate increases. In contrast, according to the present embodiment, the wasted plate portion becomes smaller. It is therefore possible to suppress the increase in the plate cost.

The contact portion 75b is connected to the extension portion 75a. More specifically, the contact portion 75b is connected to the front side (+X side) end portion of the extension portion 75a. The contact portion 75b extends radially outward from the extension portion 75a. As illustrated in FIG. 4, the contact portion 75b is fitted to the ground receiving portion 18b of the back cover flange portion 18.

Figure 11:
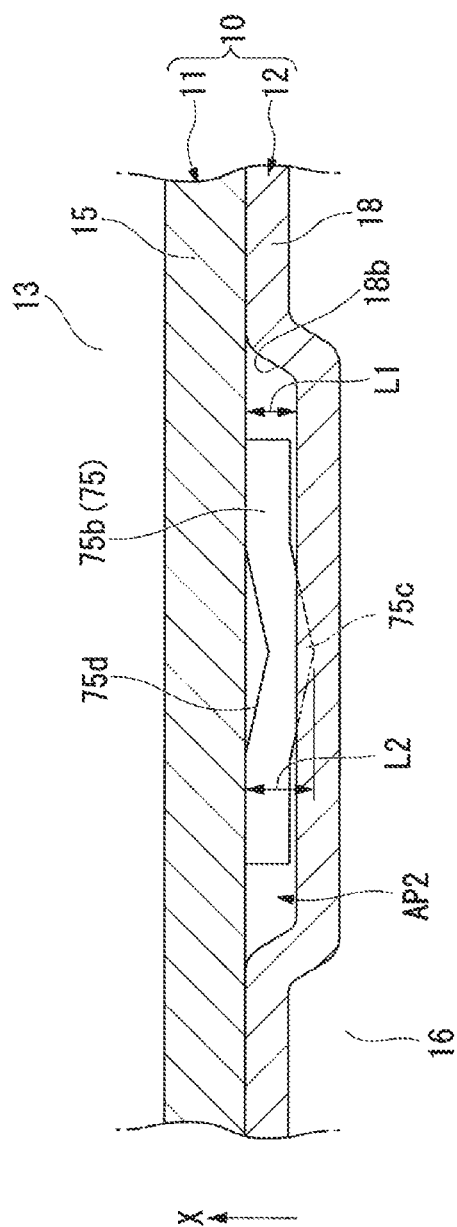
FIG. 11 is a view illustrating a ground portion according to one embodiment.

FIG. 11 is a view illustrating the contact portion 75b of the ground portion 75 which is viewed from the radial outer side. As illustrated in FIG. 11, the contact portion 75b is positioned in a gap AP2 defined by the ground receiving portion 18b and the rear side (−X side) surface of the bracket flange portion 15.

The contact portion 75b makes contact with the bracket 11 and the back cover 12. That is to say, the contact portion 75b makes contact with the housing 10. Thus, the contact portion 75b has the same electric potential as that of the housing 10. In the present embodiment, the electric potential of the housing 10 is used as a reference potential. For that reason, the ground portion 75 has a reference potential. In other words, the ground portion 75 is grounded by making contact with the housing 10.

As the bracket 11 and the back cover 12 are fixed to each other by caulking, the contact portion 75b is sandwiched by the bracket 11 and the back cover 12 in the axial direction (X-axis direction). More specifically, the contact portion 75b is axially sandwiched by the bracket flange portion 15 of the bracket 11 and the back cover flange portion 18 of the back cover 12. It is therefore possible to reliably bring the contact portion 75b into contact with the housing 10. Furthermore, it is possible to strongly fix the contact portion 75b to the housing 10.

A concave portion 75d depressed toward the rear side (−X side) is provided on the front side (+X side) surface of the contact portion 75b. A convex portion 75c bulging toward the rear side is provided on the rear surface of the contact portion 75b. That is to say, the convex portion 75c bulging in the axial direction (X-axis direction) and the concave portion 75d depressed in the axial direction are provided in the contact portion 75b.

In the present embodiment, the contact portion 75b is crushed and deformed when the bracket 11 and the back cover 12 are fixed to each other by caulking. For example, in the example illustrated in FIG. 11, the convex portion 75c of the contact portion 75b is crushed toward the front side (+X side). The deformation of the contact portion 75b may be either elastic deformation or plastic deformation.

In FIG. 11, the convex portion 75c available before the bracket 11 and the back cover 12 are fixed to each other is indicated by a double-dot chain line. The axial (X-axis direction) dimension L2 of the contact portion 75b available before the bracket 11 and the back cover 12 are fixed to each other is larger than the axial dimension L1 of the gap AP2 available after the bracket 11 and the back cover 12 are fixed to each other.

For that reason, as the bracket 11 and the back cover 12 are fixed to each other by caulking, the contact portion 75b is crushed in the axial direction (X-axis direction). As a result, it is possible to reliably bring the contact portion 75b into contact with the housing 10. Furthermore, in the present embodiment, the convex portion 75c and the concave portion 75d are provided in the contact portion 75b. Therefore, when the bracket 11 and the back cover 12 are fixed to each other by caulking, the contact portion 75b is easily deformed.

For example, the material of the housing 10, namely the bracket 11 and the back cover 12, is S45C. The material of the plate portion 70, namely the ground portion 75, is brass. The strength of S45C is larger than the strength of brass. For that reason, when the bracket 11 and the back cover 12 are fixed to each other by caulking, the contact portion 75b of the ground portion 75 is crushed by the bracket 11 and the back cover 12.

As illustrated in FIG. 9, the concave portion 75d is provided in the radial outer end portion of the contact portion 75b. While not shown in the drawings, the convex portion 75c is also provided in the radial outer end portion of the contact portion 75b. When the bracket 11 and the back cover 12 are fixed to each other by caulking, the force applied in such a direction as to crush the bracket flange portion 15 and the back cover flange portion 18 against each other grows larger toward the radial outer side. Thus, by providing the convex portion 75c and the concave portion 75d in the radial outer end portion of the contact portion 75b, it is easy to deform the contact portion 75b when the bracket 11 and the back cover 12 are fixed to each other.

As illustrated in FIG. 8, the ground portion 76 is connected to the positive-electrode-side ground support portion 73b of the plate body portion 71. That is to say, the ground portion 76 is connected to the plate body portion 71. As illustrated in FIG. 7, the ground portion 76 is positioned at the lower side (−Z side) of the center axis J. The ground portion 76 is positioned between the brush unit 50c and the brush unit 50d in the circumferential direction.

As illustrated in FIG. 8, the ground portion 76 preferably includes an extension portion 76a and a contact portion 76b. The extension portion 76a and the contact portion 76b of the ground portion 76 are the same as the extension portion 75a and the contact portion 75b of the ground portion 75.

As described above, the bracket through-hole 13a and the back cover through-hole 16a illustrated in FIG. 4 are positioned between the connector portion 35 and the ground portion 76 in the circumferential direction. For that reason, water droplets infiltrated from the connector portion 35 and passed through the bracket tube portion 13 or the back cover tube portion 16 are discharged to the outside of the housing 10 from the bracket through-hole 13a or the back cover through-hole 16a prior to reaching the ground portion 76. It is therefore possible to restrain the water droplets from adhering to the ground portion 76. As a result, it is possible to restrain the contact portion 76b of the ground portion 76 from being corroded by the water droplets and causing a grounding failure between the contact portion 76b and the housing 10.

In the present embodiment, the bracket through-hole 13a and the back cover through-hole 16a are positioned in the lower side (−Z side) end portion of the housing 10. Thus, water droplets infiltrated into the housing 10 are easily discharged from the bracket through-hole 13a or the back cover through-hole 16a. It is therefore possible to further restrain the water droplets from adhering to the ground portion 76.

As illustrated in FIG. 7, the ground portion 76 is positioned at the opposite side (−Y side) of the center axis J from the connector portion 35. This makes it possible to increase the circumferential distance from the connector portion 35 to the ground portion 76. Thus, it is possible to further restrain the water droplets infiltrated from the connector portion 35 from adhering to the ground portion 76.

As illustrated in FIG. 8, the ground portion 77 is connected to the ground support portion 74 of the plate body portion 71. In the example illustrated in FIG. 8, the ground support portion 74 is separated from the positive-electrode-side body portion 73 and the negative-electrode-side body portion 72 and, therefore, is not electrically connected to any part of the plate body portion 71. However, the ground support portion 74 is not limited to this configuration. For example, the ground portion 74 may be electrically connected to the positive-electrode-side ground support portion 73b of the positive-electrode-side body portion 73. In this case, the electric potential of the ground portion 76 is easily maintained at the reference potential.

As illustrated in FIG. 7, the ground portion 77 is positioned at the opposite side (−Y side) of the center axis J from the connector portion 35. The ground portion 77 is positioned at the same height as the center axis J. The ground portion 77 is positioned between the brush unit 50b and the brush unit 50c in the circumferential direction.

As illustrated in FIG. 8, the ground portion 77 preferably includes an extension portion 77a and a contact portion 77b. The extension portion 77a and the contact portion 77b of the ground portion 77 are the same as the extension portion 75a and the contact portion 75b of the ground portion 75.

By fixing the contact portion 75b of the ground portion 75, the contact portion 76b of the ground portion 76 and the contact portion 77b of the of the ground portion 77 to the housing 10, the brush card assembly 30 is fixed to the housing 10.

As illustrated in FIG. 9, the negative-electrode-side connection terminal 78a and the positive-electrode-side connection terminal 78b are plate-shaped members extending in the Y-axis direction. While not shown in the drawings, the radial outer (+Y side) end portion of the negative-electrode-side connection terminal 78a and the radial outer (+Y side) end portion of the positive-electrode-side connection terminal 78b are exposed to the outside of the motor 1 through the connector portion 35 which will be described later. A negative electrode of an external power source connected to the connector portion 35 is connected to the negative-electrode-side connection terminal 78a. A positive electrode of an external power source is connected to the positive-electrode-side connection terminal 78b.

As illustrated in FIG. 8, the thickness, namely the axial (X-axis direction) dimension, of the negative-electrode-side connection terminal 78a and the positive-electrode-side connection terminal 78b is larger than, for example, the thickness of the plate body portion 71. The negative-electrode-side connection terminal 78a and the positive-electrode-side connection terminal 78b are punched from, for example, a plate differing from a plate from which the plate body portion 71 is punched.

Thus, the thickness of the plate body portion 71 can be made different from the thickness of the negative-electrode-side connection terminal 78a and the thickness of the positive-electrode-side connection terminal 78b. Accordingly, it is possible to reduce the thickness of the plate body portion 71 while setting the thickness of the negative-electrode-side connection terminal 78a and the thickness of the positive-electrode-side connection terminal 78b equal to, for example, the thickness defined by the standard of connection to an external power source. As a result, it is possible to reduce the thickness of a plate from which the plate body portion 71 is punched. It is therefore possible to save the manufacturing cost of the plate body portion 71.

By punching the plate body portion 71, the negative-electrode-side connection terminal 78a and the positive-electrode-side connection terminal 78b from different plates, it is possible to reduce the amount of plate portions wasted after punching. For example, if the plate body portion 71, the negative-electrode-side connection terminal 78a and the positive-electrode-side connection terminal 78b are formed by punching a single plate, the plate portions existing around the negative-electrode-side connection terminal 78a and the positive-electrode-side connection terminal 78b, which are left after punching the negative-electrode-side connection terminal 78a and the positive-electrode-side connection terminal 78b, are wasted. Thus, the wasted portions of the plate grow larger and, therefore, the cost of the plate increases. In contrast, according to the present embodiment, the wasted portions of the plate are reduced. It is therefore possible to suppress an increase in the cost of the plate.

When the plate body portion 71 and the ground portions 75 to 77 are punched from, for example, a single plate, they are punched as a single member in a mutually-connected state. Similarly, the negative-electrode-side connection terminal 78a and the positive-electrode-side connection terminal 78b are punched from, for example, a single plate as a single member in a mutually-connected state. After going through an insert-molding process, the regions which interconnect the respective portions are punched by a press machine. Thus, the interconnected portions are divided into the individual portions described above.

<Resin Portion>

As illustrated in FIG. 6, the resin portion 32 is a resin-made portion that holds the plate portion 70. The resin portion 32 preferably includes a tubular portion 33, a resin body portion 34 and a connector portion 35. That is to say, the connector portion 35 is provided in the brush card 31.

The tubular portion 33 is a portion extending from the outer edge of the resin body portion 34 in the axial direction (X-axis direction). The tubular portion 33 preferably includes a connector wall portion 33a, brush wall portions 33b, a lower wall portion 33c, an upper wall portion 33d and ground support wall portions 33e.

The connector wall portion 33a is a portion connected to the connector portion 35. The connector wall portion 33a is positioned in the +Y side end portion of the tubular portion 33.

The brush wall portions 33b are positioned at the radial outer side of the respective brush units 50a to 50d. The brush wall portions 33b extend toward the front side (+X side) beyond the respective brush units 50a to 50d. It is therefore possible to restrain the brush units 50a to 50d from making contact with the back cover 12 having a reference potential. Furthermore, it is possible to restrain the water droplets infiltrated into the back cover 12 from adhering to the brush units 50a to 50d, namely the brushes 51a to 51d.

As illustrated in FIG. 7, the lower wall portion 33c is positioned in the lower side (−Z side) end portion of the tubular portion 33. The lower wall portion 33c is circumferentially connected to, e.g., the brush wall portion 33b positioned at the radial outer side of the brush unit 50d. As illustrated in FIG. 4, the lower wall portion 33c is radially opposed to the expansion portion 16b of the back cover 12. The lower wall portion 33c extends from the rear side (−X side) of the back cover through-hole 16a toward the front side (+X side) of the back cover tube portion 16. Thus, the back cover through-hole 16a radially overlaps with the lower wall portion 33c, namely the tubular portion 33 of the back cover 12.

Figure 12:
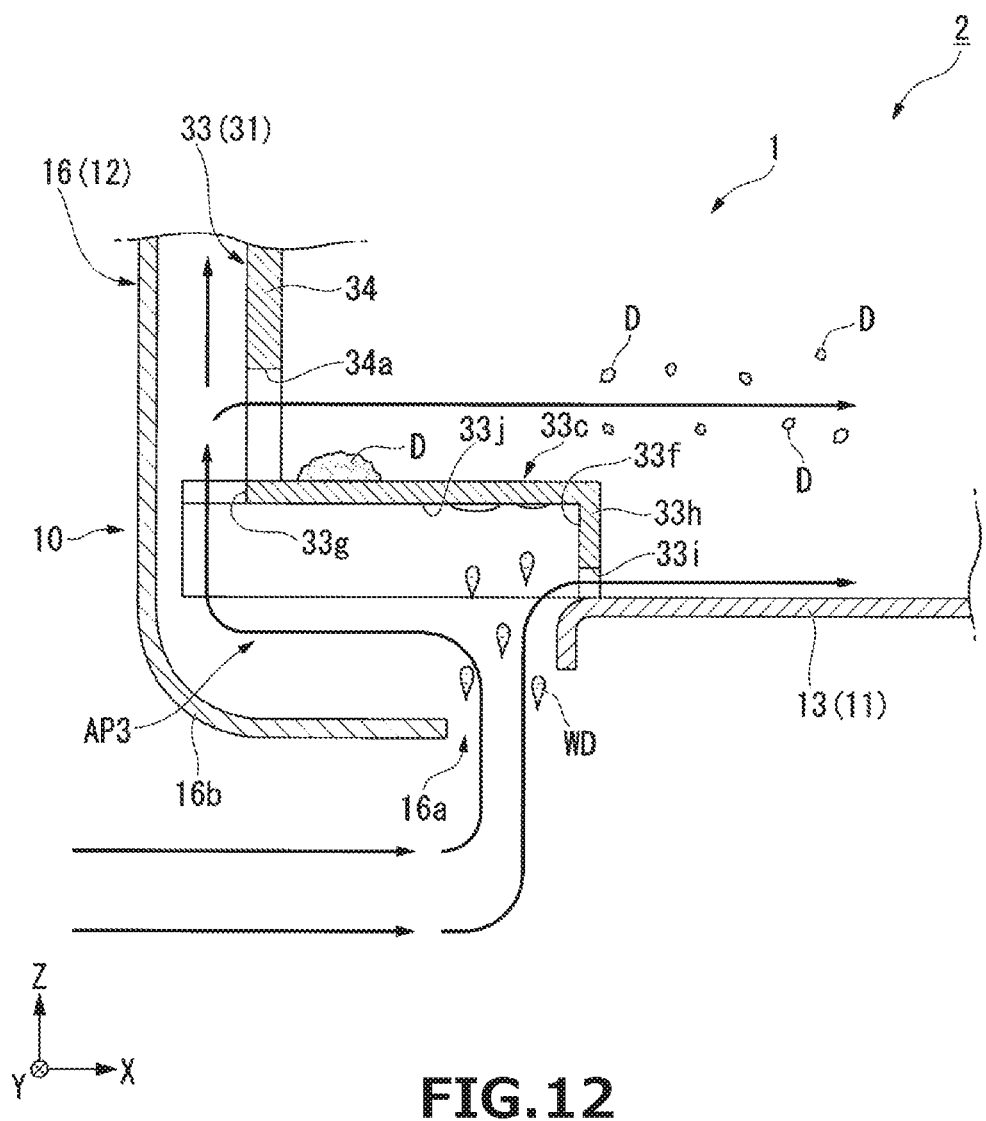
FIG. 12 is a view illustrating the flow of an air introduced into the motor according to one embodiment.

FIG. 12 is a sectional view illustrating the flow of an air introduced from the back cover through-hole 16a into the motor 1. In FIG. 12, the flow of an air is indicated by thick arrows. As illustrated in FIG. 12, there may be a case where water droplets WD are infiltrated from the back cover through-hole 16a together with the air introduced from the back cover through-hole 16a into the motor 1, namely the housing 10. According to the present embodiment, the water droplets WD infiltrated from the back cover through-hole 16a are blocked by the lower wall portion 33c. It is therefore possible to restrain the water droplets WD from infiltrating into the brush card 31.

In the meantime, the air introduced from the back cover through-hole 16a into the housing 10 goes around toward the front side (+X side) or the rear side (−X side) of the lower wall portion 33c. Thus, as described above, the air flows through the motor 1 from the rear side toward the front side, thereby cooling the motor 1. In order to suppress infiltration of the water droplets WD into the brush card 31 while enhancing the cooling efficiency as far as possible, it is preferred that the interior of the brush card 31 is not visible at all from the back cover through-hole 16a.

As illustrated in FIG. 4, a brush card recess portion 33f depressed radially inward is provided in the lower wall portion 33c. As illustrated in FIG. 12, the brush card recess portion 33f is opposed to the expansion portion 16b of the back cover 12 in the up-down direction (Z-axis direction). Thus, it is possible to enlarge an up-down-direction space AP3 defined between the lower wall portion 33c and the expansion portion 16b. This enables the air introduced from the back cover through-hole 16a to flow with ease.

Figure 13:
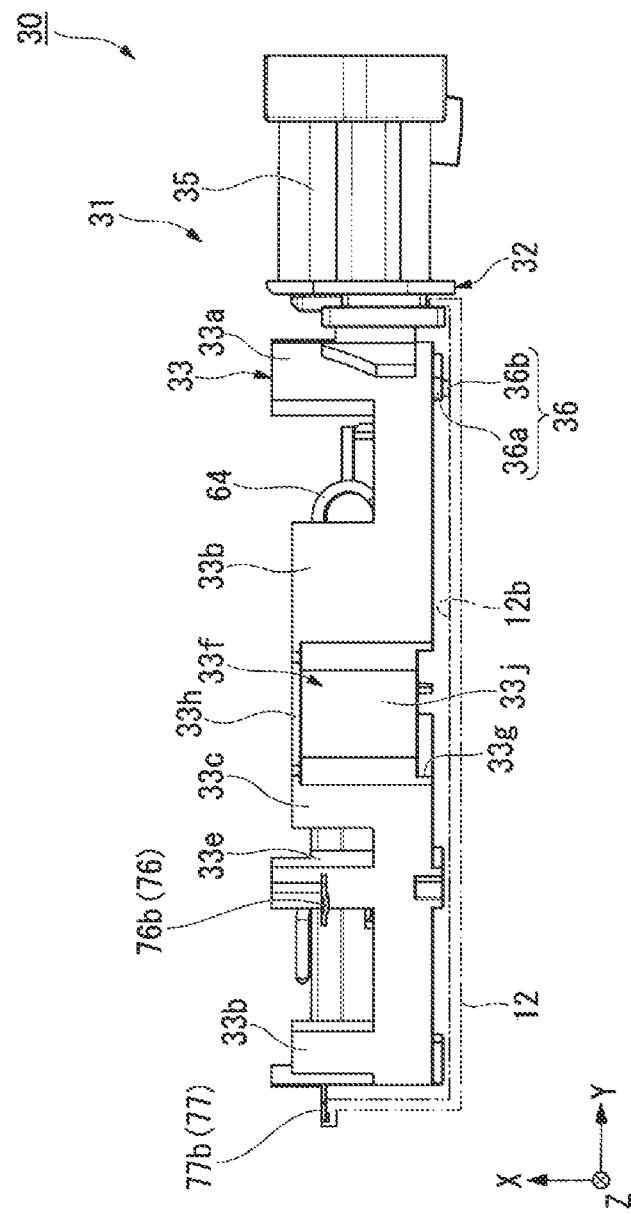
FIG. 13 is a bottom view illustrating the brush card assembly according to one embodiment.

FIG. 13 is a bottom view illustrating the brush card assembly 30 viewed from the lower side (−Z side). As illustrated in FIG. 13, a first wall through-hole 33g extending through the lower wall portion 33c in the radial direction and opened toward the rear side is provided in the rear side (−X side) end portion of a bottom surface 33j of the brush card recess portion 33f. Thus, as illustrated in FIG. 12, it is possible to widen the passage of the air which goes around from the back cover through-hole 16a toward the rear side of the brush card 31. This enables the air to easily flow toward the upper side (+Z side) within the motor 1. It is therefore easy to cool the motor 1 as a whole.

The water droplets WD blocked by the lower wall portion 33c adhere to, e.g., the bottom surface 33j of the brush card recess portion 33f. According to the present embodiment, the water droplets WD adhering to the bottom surface 33j are blocked by a front side (+X side) inner wall portion 33h of the brush card recess portion 33f. Thus, it is possible to restrain the water droplets WD from infiltrating into the inside of the bracket 11 and to restrain the water droplets WD from adhering to the rotor 20 or the like.

A second wall through-hole 33i extending through the front side inner wall portion 33h in the axial direction (X-axis direction) and opened toward the lower side (−Z side) is provided in the front side inner wall portion 33h of the brush card recess portion 33f. Thus, it is possible to widen the passage of the air which goes around from the back cover through-hole 16a toward the front side (+X side) of the brush card 31. This enables the air to easily flow from the rear side (−X side) toward the front side within the motor 1. It is therefore possible to further cool the motor 1.

As illustrated in FIG. 7, the upper wall portion 33d is positioned in the upper side (+Z side) end portion of the tubular portion 33. The upper wall portion 33d is circumferentially connected to, e.g., the brush wall portion 33b positioned at the radial outer side of the brush unit 50a. The shape of the upper wall portion 33d is the same as the shape of the lower wall portion 33c.

As illustrated in FIG. 6, the ground support wall portions 33e are portions that support the ground portions 75 to 77. The ground support wall portions 33e cover the extension portions 75a to 77a of the ground portions 75 to 77. That is to say, the tubular portion 33 covers the extension portions 75a to 77a. This makes it possible to prevent the water droplets infiltrated into the housing 10 from adhering to the extension portions 75a to 77a of the ground portions 75 to 77. Since the brush card 31 is manufactured by, e.g., an insert-molding process as described above, it is easy to obtain a configuration in which the extension portions 75a to 77a are covered by the tubular portion 33.

As illustrated in FIG. 13, the connector wall portion 33a, the brush wall portions 33b, the lower wall portion 33c and the ground support wall portions 33e are identical in, e.g., the axial (X-axis direction) position of the front side (+X side) end portions thereof. While not shown in the drawings, the axial position of the front side end portion of the upper wall portion 33d is the same as that of the lower wall portion 33c.

As illustrated in FIG. 7, the connector portion 35 is connected to the radial outer surface of the connector wall portion 33a of the tubular portion 33. The connector portion 35 extends toward the radial outer side (+Y side). While not shown in the drawings, the connector portion 35 has a tubular shape opened toward the radial outer side (+Y side). The radial outer end portion of the negative-electrode-side connection terminal 78a and the radial outer end portion of the positive-electrode-side connection terminal 78b are exposed within the connector portion 35. An external power source not illustrated is connected to the connector portion 35.

The resin body portion 34 is a portion that holds the plate body portion 71 of the plate portion 70. As illustrated in FIG. 7, the resin body portion 34 has a ring shape. In the present embodiment, the resin body portion 34 has, e.g., a substantially annular shape concentric with the center axis J. The commutator 25 is positioned inside the resin body portion 34.

A brush card through-hole 34a extending through the brush card 31 in the axial direction (X-axis direction) is provided in the resin body portion 34. That is to say, the brush card through-hole 34a is provided in the brush card 31. The brush card through-hole 34a is provided in the lower side (−Z side) end portion of the resin body portion 34. The brush card through-hole 34a is positioned radially outward of the brushes 51a to 51d.

Thus, in the case where the brush card through-hole 34a is positioned in the lower side (−Z side) end portion of the resin body portion 34 as illustrated in FIG. 7, the brush card through-hole 34a is positioned at the lower side of the brushes 51a to 51d. Thus, in the case where water droplets are gathered at the lower end of the interior of the brush card 31, the water droplets are discharged from the brush card through-hole 34a if the level of the water droplets reaches the brush card through-hole 34a. For that reason, the level of the water droplets does not reach the height of the brushes 51a to 51d. It is therefore possible to prevent the water droplets from adhering to the brushes 51a to 51d.

As illustrated in FIG. 12, the air introduced from the back cover through-hole 16a and going around toward the rear side (−X side) of the brush card 31 is introduced into the tubular portion 33 of the brush card 31 through the brush card through-hole 34a. This makes it possible to cool the interior of the brush card 31. The air going around toward the rear side of the brush card 31 flows toward the front side (+X side) via the brush card through-hole 34a. Thus, the air easily flows from the rear side toward the front side within the motor 1, thereby further cooling the motor 1.

Furthermore, there may be a case where dust particles D generated by, for example, the cutting of the surfaces of the brushes 51a to 51d are gathered at the lower end of the interior of the brush card 31. The dust particles D may be solidified together with water droplets WD and may be fixed within the brush card 31.

In contrast, according to the present embodiment, the air flows from the rear side (−X side) of the brush card 31 toward the front side (+X side) through the brush card through-hole 34a. This makes it possible to blow away the dust particles D toward the bracket 11. Thus, it is possible to restrain the dust particles D from being fixed to the interior of the brush card 31. The dust particles D blown away toward the bracket 11 by the air are discharged from the interior of the motor 1 via the front side hole portions 14a of the bracket 11.

As illustrated in FIG. 7, a brush card through-hole 34b extending through the brush card 31 in the axial direction (X-axis direction) is provided in the resin body portion 34. The brush card through-hole 34b is provided in the upper side (+Z side) end portion of the resin body portion 34. The brush card through-hole 34b is positioned at the radial outer side of the brushes 51a to 51d.

Thus, for example, if the brush card 31 is disposed upside down with respect to the posture illustrated in FIG. 7, the brush card through-hole 34b has the same function as that of the brush card through-hole 34a. Even when the brush card 31 is disposed s illustrated in FIG. 7, it is possible to enable the air to easily flow from the rear side (−X side) of the brush card 31 toward the front side (+X side) by providing the brush card through-hole 34b.

Resin body hole portions 34c and 34d extending through the brush card 31 in the axial direction (X-axis direction) are provided in the resin body portion 34. Thus, it is possible to enable the air to easily flow from the rear side (−X side) of the brush card 31 toward the front side (+X side). The resin body hole portion 34c is positioned at the radial inner side of the ground portions 75 and 76. The resin body hole portion 34d is positioned at the radial inner side of the ground portion 77.

As illustrated in FIG. 10, a protruding wall portion 37 is provided on the front side (+X side) surface of the resin body portion 34. The protruding wall portion 37 protrudes from the front side surface of the resin body portion 34 toward the front side. The protruding wall portion 37 is positioned at the radial outer side of the brush unit installation portion 73c. The protruding wall portion 37 preferably includes a first protruding wall portion 37a, a second protruding wall portion 37b and a third protruding wall portion 37c.

The first protruding wall portion 37a and the second protruding wall portion 37b extend in the radial direction. The third protruding wall portion 37c interconnects the radial outer end portion of the first protruding wall portion 37a and the radial outer end portion of the second protruding wall portion 37b. The third protruding wall portion 37c is provided in a position where the third protruding wall portion 37c is radially opposed to the brush wall portion 33b. The third protruding wall portion 37c and the brush wall portion 33b are radially spaced apart from each other.

The radial outer end portion of the brush unit 50c is positioned in a space surrounded by the first protruding wall portion 37a, the second protruding wall portion 37b and the third protruding wall portion 37c. Thus, for example, even if the water droplets infiltrated into the tubular portion 33 flow along the brush wall portion 33b, it is possible to restrain the water droplets from adhering to the brush unit 50c, namely the brush 51c. Since the third protruding wall portion 37c is provided in a position radially spaced apart from the brush wall portion 33b, the third protruding wall portion 37c is difficult to inhibit the movement of the water droplets flowing along the brush wall portion 33b. Thus, the water droplets are easy to flow along the tubular portion 33 and to move toward the lower side (−Z side). As a result, according to the present embodiment, the water droplets are easily discharged through, e.g., the brush card through-hole 34a.

While not shown in the drawings, protruding wall portions 37 are similarly provided at the radial outer side of the brush unit installation portions 72c, 72d and 73d.

As illustrated in FIG. 6, inner wall portions 38a and 38b are provided at the inner edge of the resin body portion 34. The inner wall portions 38a and 38b extend from the inner edge of the resin body portion 34 toward the front side (+X side). The inner wall portion 38a is positioned between the brush 51a and the brush 51b in the circumferential direction. The inner wall portion 38b is positioned between the brush 51c and the brush 51d in the circumferential direction. By virtue of the inner wall portions 38a and 38b, it is possible to restrain the below-mentioned pigtails 53a to 53d of the brush units 50a to 50d from entering the radial inner side of the inner edge of the resin body portion 34. This makes it possible to suppress such a trouble that the pigtails 53a to 53d are caught in the commutator 25.

An inner wall hole portion 39 extending through the inner wall portion 38b in the radial direction is provided in the inner wall portion 38b. This holds true with respect to the inner wall portion 38a. Thus, the air introduced into the brush card 31 is easy to enter the radial inner side of the inner edge of the resin body portion 34. It is therefore possible to easily cool the gaps between the brushes 51a to 51d and the commutator 25 which tend to become hot.

Figure 14:
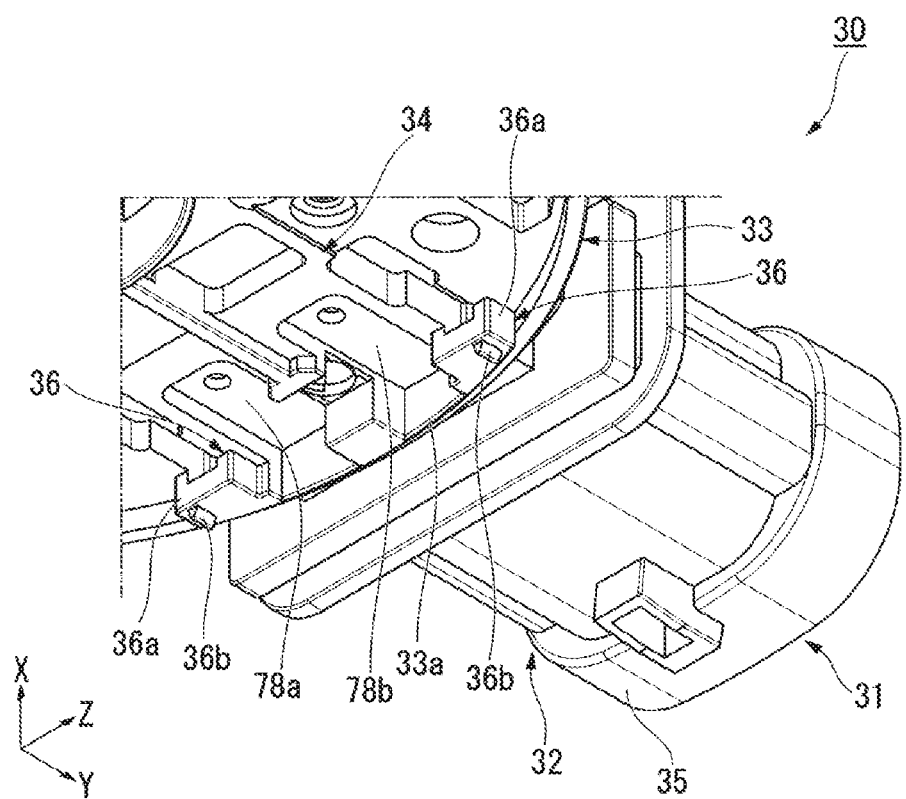
FIG. 14 is a perspective view illustrating the brush card assembly according to one embodiment.

FIG. 14 is a perspective view illustrating a portion of the brush card assembly 30. FIG. 14 is a perspective view of the brush card assembly 30 viewed from the lower side (−Z side). As illustrated in FIGS. 13 and 14, projection portions 36 protruding toward the rear side are provided on the rear side (−X side) surface of the resin body portion 34. That is to say, the projection portions 36 are provided on the back cover side (−X side) surface of the brush card 31. The projection portions 36 are positioned at the side of the connector portion 35 (+Y side), namely at the opposite side from the ground portions 75 to 77, with respect to the center axis J. There are provided, for example, two projection portions 36. Each of the projection portions 36 preferably includes a support projection portion 36a and a contact projection portion 36b.

The support projection portion 36a is a portion protruding from the resin body portion 34 toward the rear side (−X side). The support projection portion 36a is connected to the radial inner surface of the tubular portion 33.

The contact projection portion 36b is a portion that protrudes from the rear surface of the support projection portion 36a toward the rear side. As illustrated in FIG. 13, the support projection portion 36a makes contact with the front surface 12b existing at the front side (+X side) of the rear flat portion 17 of the back cover 12. That is to say, the projection portions 36 make contact with the back cover 12.

As described above, the brush card assembly 30 is fixed to the housing 10 as the ground portions 75 to 77 positioned at the opposite side of the center axis J from the connector portion 35 are fixed to the housing 10. Thus, in addition to the fixing by the ground portions 75 to 77, the projection portions 36 positioned at the side of the connector portion 35 with respect to the center axis J make contact with the back cover 12. This makes it possible to stably hold the brush card assembly 30 with respect to the housing 10.

<Brush Unit>

The brush units 50a to 50d are disposed along the circumferential direction. That is to say, the brushes 51a to 51d are disposed along the circumferential direction. The brush units 50a to 50d have the same configuration except the differences in the position in which the brush units 50a to 50d are disposed and in the position in which the brush units 50a to 50d are connected to the plate body portion 71. For that reason, in the following descriptions, there may be a case where only the brush unit 50c is representatively described.

Figure 15:
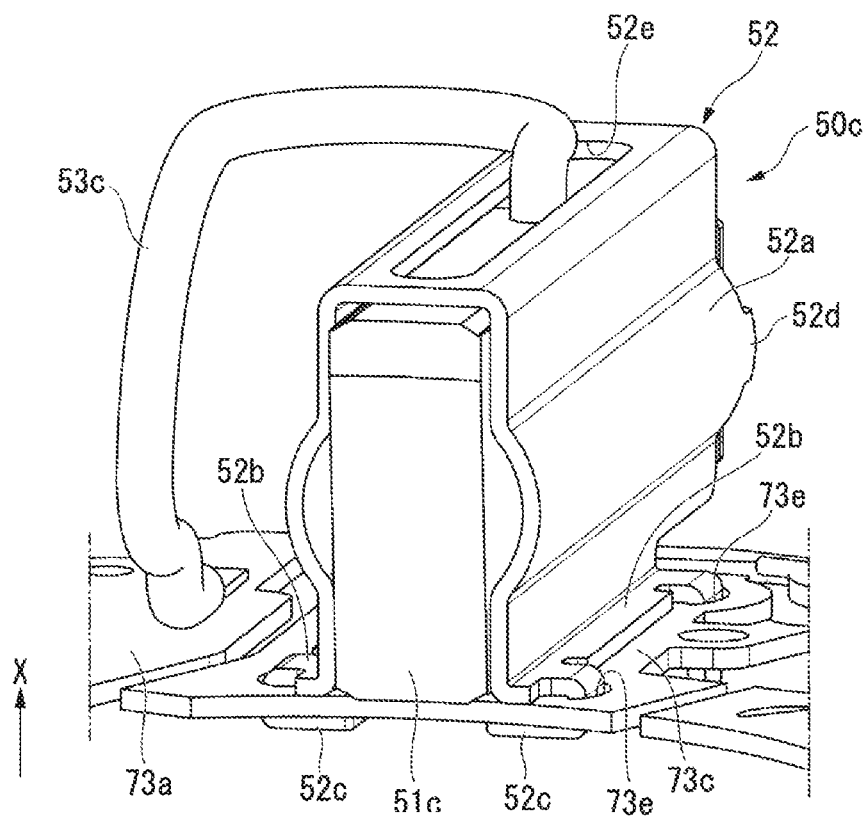
FIG. 15 is a perspective view illustrating a brush unit according to one embodiment.
Figure 16:
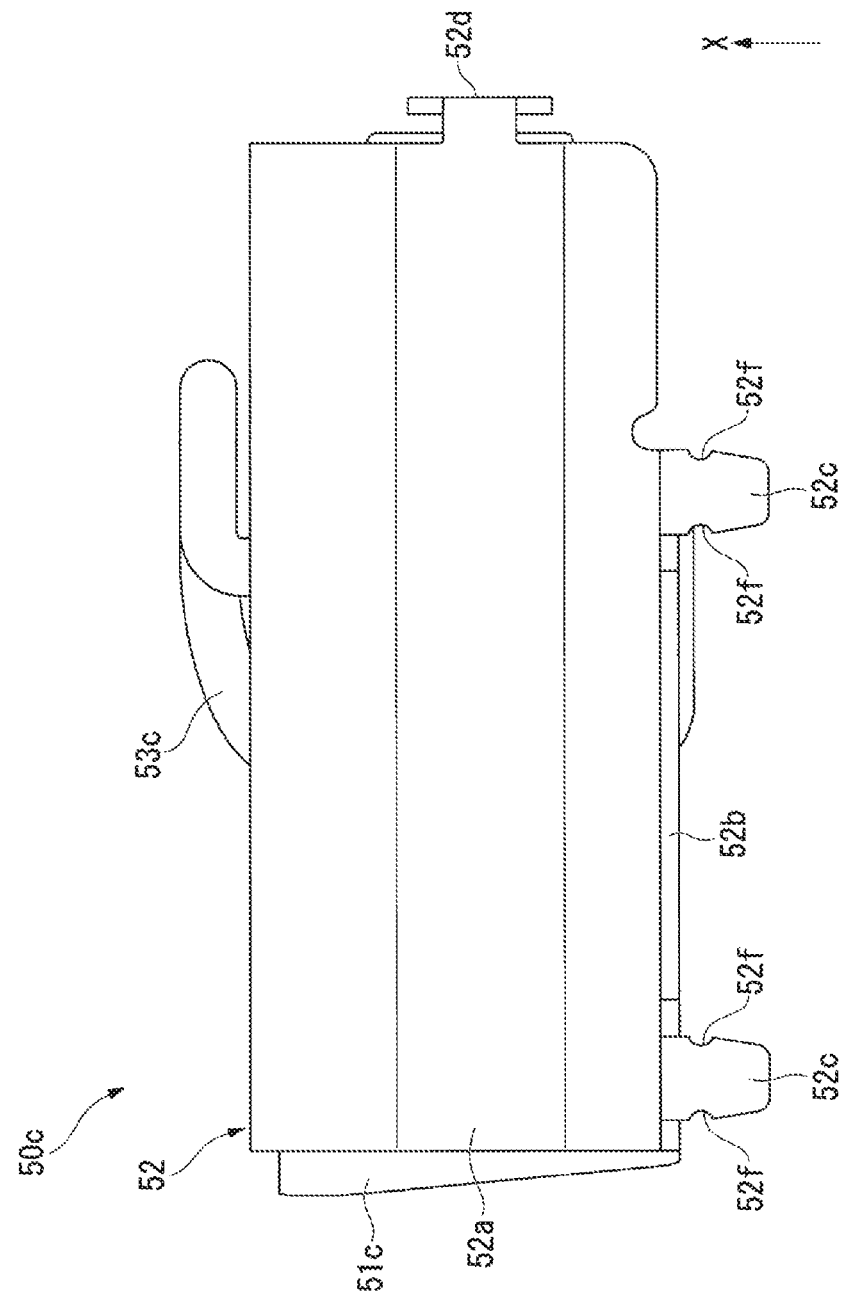
FIG. 16 is a side view illustrating the brush unit according to one embodiment.

FIG. 15 is a perspective view illustrating the brush unit 50c. FIG. 16 is a side view illustrating the brush unit 50c. In FIG. 16, there is illustrated the brush unit 50c which is not mounted to the brush unit installation portion 73c. As illustrated in FIGS. 8, 15 and 16, the brush unit 50c preferably includes a brush case 52, a brush 51c, a pigtail 53c and a spring 54.

As illustrated in FIG. 15, the brush case 52 accommodates the brush 51c therein. The brush case 52 is opened at the radial opposite ends thereof. The brush case 52 preferably includes a brush case body 52a, case flange portions 52b, mounting leg portions 52c and caulking portions 52d.

The brush case body 52a is a substantially U-shape portion opened toward the rear side (−X side) when viewed in the radial direction. An opening portion 52e is provided on the front side (+X side) surface of the brush case body 52a.

The case flange portions 52b are portions that extend from the rear side (−X side) end portions of the brush case body 52a toward the opposite side of the brush 51c. The case flange portions 52b are respectively provided at the circumferential opposite sides of the brush case body 52a. The rear surfaces of the case flange portions 52b make contact with the front side (+X side) surface of the brush unit installation portion 73c.

The mounting leg portions 52c are connected to the opposite end portions of the case flange portions 52b from the brush case body 52a. The mounting leg portions 52c are inserted into the mounting hole portions 73e of the brush unit installation portion 73c. The portions of the mounting leg portions 52c protruding toward the rear side (−X side) beyond the mounting hole portions 73e are caulked toward the brush 51c. Thus, the brush case 52 is fixed to the brush unit installation portion 73c. The brush unit 50c is installed in the brush unit installation portion 73c.

According to the present embodiment, the brush case 52 and the brush unit installation portion 73c are made of metal and are fixed to each other by caulking so that a resin is not interposed between the brush case 52 and the brush unit installation portion 73c. This makes it easy to accurately dispose the brush case 52. Since the brush case 52 includes the case flange portions 52b, the mounting leg portions 52c and the case flange portions 52b can be pressed against each other through the brush unit installation portion 73c when caulking the mounting leg portions 52c. Thus, it is easy to caulk the mounting leg portions 52c. It is also possible to reliably fix the brush case 52 with respect to the brush unit installation portion 73c in an accurate position.

As illustrated in FIG. 16, each of the mounting leg portions 52c preferably includes positioning recess portions 52f formed at the opposite sides in the extension direction of the brush 51c, namely in the left-right direction in FIG. 16. The two positioning recess portions 52f are depressed in the extension direction of the brush 51c and are opposed to each other. The inner edges of the positioning recess portions 52f make contact with the inner edges of the mounting hole portions 73e. The positioning recess portions 52f have, e.g., an arc shape.

Thus, even when an error is generated in the dimension of the mounting hole portions 73e or the dimension of the mounting leg portions 52c, it is easy to bring any of the inner edges of the positioning recess portions 52f into contact with any of the inner edges of the mounting hole portions 73e. Thus, the mounting leg portions 52c can be stably supported by the inner edges of the mounting hole portions 73e. As a result, it is possible to strongly fix the brush unit 50c in any of the radial direction, the axial direction and the circumferential direction.

The brush 51c is provided so as to radially move within a space surrounded by the brush case 52 and the brush unit installation portion 73c. As illustrated in FIG. 7, the radial inner end portion of the brush 51c protrudes radially inward beyond the brush case 52. The radial inner end portion of the brush 51c makes contact with the segment 25b of the commutator 25. The brush 51c has a rectangular parallelepiped shape and extends in the radial direction. This holds true with respect to the brushes 51a, 51b and 51d.

The brush 51a and the brush 51b are connected to the negative-electrode-side wiring portion 72a. That is to say, the brush 51a and the brush 51b are negative electrode brushes. The brush 51c and the brush 51d are connected to the positive-electrode-side wiring portion 73a. That is to say, the brush 51c and the brush 51d are positive electrode brushes.

As illustrated in FIG. 3, the radial inner end surface of the brush 51a makes contact with the segment 25b of the commutator 25. This holds true with respect to the brushes 51b to 51d. The negative electrode brush 51a and the positive electrode brush 51c are electrically connected to each other via the commutator 25 and the coil 23. The negative electrode brush 51b and the positive electrode brush 51d are electrically connected to each other via the commutator 25 and the coil 23. That is to say, in the present embodiment, the brush card assembly 30 includes two pairs of brushes having different polarities and electrically connected to each other via the commutator 25 and the coil 23.

As illustrated in FIG. 7, the brush 51a and the brush 51b, which are negative electrode brushes, are provided in the positions mutually spaced apart by "θ1" in the circumferential direction. "θ1" is, e.g., 90 degrees. This holds true with respect to the brush 51c and the brush 51d which are positive electrode brushes. That is to say, the brushes having the same polarity are provided in the positions mutually spaced apart 90 degrees in the circumferential direction.

The brush 51a and the brush 51c, which make a pair, are provided in the positions mutually spaced apart by "θ2" in the circumferential direction. "θ2" is, e.g., 135 degrees. This holds true with respect to the brush 51b and the brush 51d which make another pair. That is to say, the brushes which make a pair having different polarities are provided in the positions mutually spaced apart 135 degrees in the circumferential direction.

By disposing the respective brushes 51a to 51d in this way, it is possible to suitably switch the flow of an electric current flowing through the coils 23 in the case where the number of poles of the permanent magnets 40 is eight.

When viewed in the axial direction (X-axis direction), the brushes 51a to 51d are provided in line symmetry with respect to a line C1 which interconnects the connector portion 35 and the center axis J. The connector portion 35 is positioned between the brush 51a and the brush 51d in the circumferential direction. The circumferential distance between the brush 51a and the brush 51d is largest among the circumferential distances between the respective brushes 51a to 51d. That is to say, the connector portion 35 is provided in one of circumferential gaps between the brushes 51a to 51d of the brush card 31 where the circumferential distance between the brushes 51a to 51d is largest.

Thus, it is possible to increase the circumferential distance from the connector portion 35 to the brushes 51a to 51d. This makes it possible to further restrain the water droplets infiltrated from the connector portion 35 from adhering to the brushes 51a to 51d. Furthermore, it is easy to dispose the ground portions 75 and 76 in the positions spaced apart from the connector portion 35 in the circumferential direction. This makes it possible to further restrain the water droplets infiltrated from the connector portion 35 from adhering to the ground portions 75 and 76.

As illustrated in FIG. 8, the caulking portions 52d are connected to the radial outer end portion of the brush case body 52a. The caulking portions 52d are respectively provided at the circumferential opposite sides of the brush case body 52a. The caulking portions 52d are caulked toward the brush 51c. The caulking portions 52d covers a portion of the radial outer opening of the brush case body 52a.

One end of the pigtail 53c is connected to the radial outer end portion of the front side (+X side) surface of the brush 51c. The pigtail 53c extends to the outside of the brush case 52 via the opening portion 52e of the brush case body 52a. The other end of the pigtail 53c is connected to the positive-electrode-side wiring portion 73a. Thus, the brush 51a and the positive-electrode-side wiring portion 73a are electrically connected to each other via the pigtail 53c.

Similarly, the brush unit 50a includes a pigtail 53a. The brush unit 50b includes a pigtail 53b. the brush unit 50d includes a pigtail 53d. The pigtail 53a interconnects the brush 51a and the negative-electrode-side wiring portion 72a. The pigtail 53b interconnects the brush 51b and the negative-electrode-side wiring portion 72a. The pigtail 53d interconnects the brush 51d and the positive-electrode-side wiring portion 73a.

As illustrated in FIG. 7, the connection position of the pigtail 53a and the negative-electrode-side wiring portion 72a and the connection position of the pigtail 53b and the negative-electrode-side wiring portion 72a are positioned between the brush 51a and the brush 51b in the circumferential direction. The connection position of the pigtail 53c and the positive-electrode-side wiring portion 73a and the connection position of the pigtail 53d and the positive-electrode-side wiring portion 73a are positioned between the brush 51c and the brush 51d in the circumferential direction.

Thus, by providing the inner wall portions 38a and 38b at two points in the circumferential gap between the brush 51a and the brush 51b and the circumferential gap between the brush 51c and the brush 51d, it is possible to restrain the four pigtails 53a to 53d from entering the radial inner side of the inner edge of the resin body portion 34. That is to say, it is possible to reduce the number of the inner wall portions 38a and 38b provided at the inner edge of the resin body portion 34. This enables the air to easily flow within the brush card 31.

The spring 54 is accommodated inside the brush case body 52a. The spring 54 is positioned at the radial outer side of the brush 51c. The radial outer end portion of the spring 54 is supported by the caulking portions 52d of the brush case body 52a. Thus, the spring 54 is prevented from being removed from the inside of the brush case body 52a.

The radial inner end portion of the spring 54 makes contact with the radial outer end portion of the brush 51c. The spring 54 applies a force acting radially inward to the brush 51c. Thus, the brush 51c is pressed against the commutator 25. This makes it possible to bring the brush 51c into contact with the segment 25b of the commutator 25.

<X Capacitor and Y Capacitor>

As illustrated in FIG. 9, the X capacitor 60 is connected to the negative-electrode-side wiring portion 72a and the positive-electrode-side wiring portion 73a. The X capacitor 60 and the brushes 51a to 51d are directly connected to each other.

In the subject specification, the expression "certain objects are directly connected to each other" include a case where certain objects are connected to each other via a member primarily functioning to deliver an electric current. That is to say, the expression "the X capacitor 60 and the brushes 51a to 51d are directly connected to each other" includes a case where, as in the example illustrated in FIG. 9, the X capacitor 60 and the brushes 51a to 51d are connected to each other via the negative-electrode-side wiring portion 72a or the positive-electrode-side wiring portion 73a primarily functioning to deliver an electric current. As an example, a case where the X capacitor 60 and the brushes 51a to 51d are indirectly connected to each other refers to a case where the X capacitor 60 and the brushes 51a to 51d are connected to each other via, e.g., the choke coils 63 and 64.

The X capacitor 60 is positioned between the brushes in the circumferential direction. In the example illustrated in FIG. 9, the X capacitor 60 is positioned between the brush 51b and the brush 51c in the circumferential direction. That is to say, in the present embodiment, the X capacitor 60 is positioned between the brushes having different polarities in the circumferential direction.

The Y capacitor 61 is connected to the negative-electrode-side wiring portion 72a and the negative-electrode-side ground support portion 72b. Since the negative-electrode-side ground support portion 72b is connected to the ground portion 75, the Y capacitor 61 is electrically connected to the ground portion 75.

The negative-electrode-side wiring portion 72a is connected to the brush 51a and the brush 51b. Thus, the Y capacitor 61 is connected to the brush 51a and the brush 51b via the negative-electrode-side wiring portion 72a. That is to say, the Y capacitor 61 is connected to the brushes 51a and 51b having the same polarity. The Y capacitor 61 is positioned between the brush 51a and the brush 51b in the circumferential direction. That is to say, the Y capacitor 61 is positioned between the brushes having the same polarity in the circumferential direction.

The Y capacitor 62 is connected to the positive-electrode-side wiring portion 73a and the positive-electrode-side ground support portion 73b. Since the positive-electrode-side ground support portion 73b is connected to the ground portion 76, the Y capacitor 62 is electrically connected to the ground portion 76.

The positive-electrode-side wiring portion 73a is connected to the brush 51c and the brush 51d. Thus, the Y capacitor 62 is connected to the brush 51c and the brush 51d via the positive-electrode-side wiring portion 73a. That is to say, the Y capacitor 62 is connected to the brushes 51c and 51d having the same polarity. The Y capacitor 62 is positioned between the brush 51c and the brush 51d in the circumferential direction. That is to say, the Y capacitor 62 is positioned between the brushes having the same polarity in the circumferential direction.

<Choke Coil>

The choke coil 63 interconnects the negative-electrode-side connection terminal 78a and the negative-electrode-side wiring portion 72a. The choke coil 64 interconnects the positive-electrode-side connection terminal 78b and the positive-electrode-side wiring portion 73a. The choke coils 63 and 64 are positioned between the brush 51a and the brush 51d in the circumferential direction.

The choke coil 63 is, for example, a fuse-carrying choke coil having a fuse 63a. Thus, it is possible for the choke coil 63 to further reduce a power source noise flowing from a power source. For example, even when an abnormal current is generated by the short circuit of the X capacitor 60, the Y capacitors 61 and 62 and the choke coils 63 and 64, the fuse 63a is operated to prevent the abnormal current from flowing back toward the power source.

As illustrated in FIG. 7, when viewed in the axial direction (X-axis direction), the brushes 51a to 51d, the X capacitor 60, the Y capacitors 61 and 62 and the ground portions 75 and 76 are provided in line symmetry with respect to a line C1 which interconnects the connector portion 35 and the center axis J. For that reason, the brush card assembly 30 may be used upside down with respect to the posture illustrated in FIG. 7.

Figure 17:
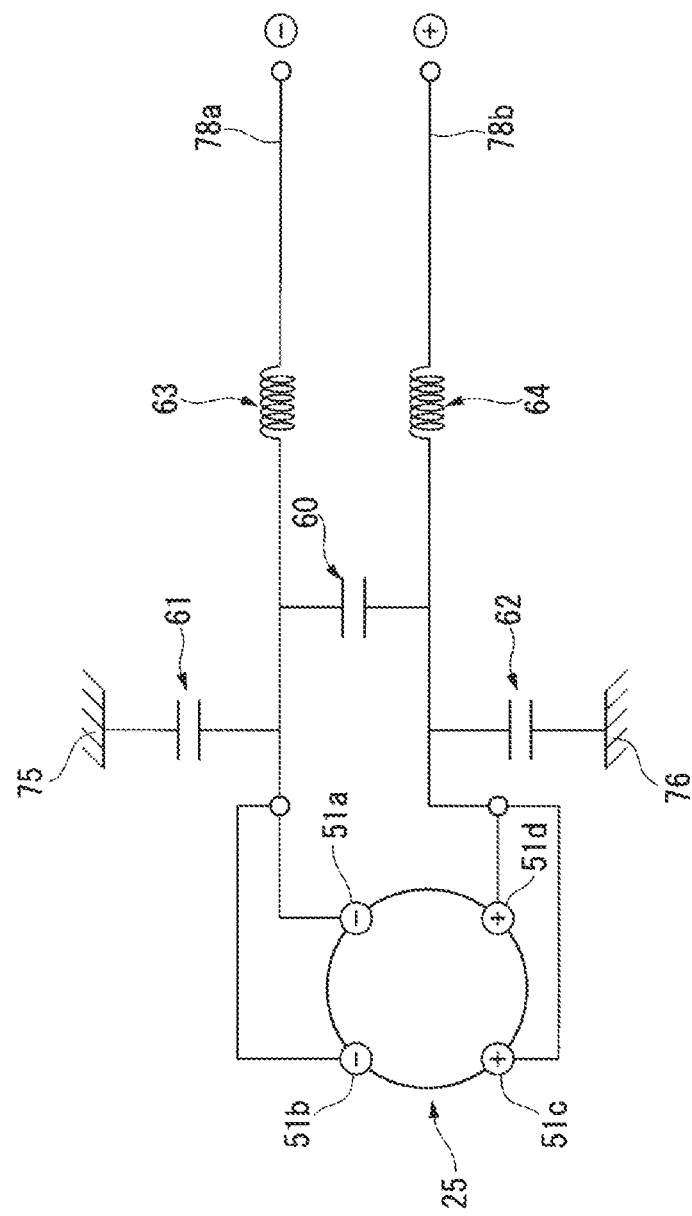
FIG. 17 is a circuit diagram illustrating a circuit of the brush card assembly according to one embodiment.

Next, descriptions will be made on a circuit configuration according to one embodiment. FIG. 17 is a view illustrating a circuit configuration according to one embodiment.

As illustrated in FIG. 17, the X capacitor 60 is parallel-connected to the brushes 51a to 51d. The Y capacitors 61 and 62 are respectively connected to the ground portions 75 and 76 and are parallel-connected to the brushes 51a to 51d. It is therefore possible to reduce the electromagnetic noise generated from the brushes 51a to 51d.

More specifically, the electromagnetic noise attributable to the spark generated between the brushes 51a to 51d and the segments 25b of the commutator 25 is a conduction noise which conducts on a power source line. The conduction noise includes a normal mode noise, a deferential mode noise and a common mode noise. According to the present embodiment, it is possible for the X capacitor 60 to reduce the normal mode noise. Furthermore, it is possible for the Y capacitors 61 and 62 to reduce the common mode noise.

The conduction noise generates a radiation noise when conducting on the power source line. Thus, by disposing a conduction-noise-suppressing element near a conduction noise generation source, it is possible to reduce the radiation noise attributable to the conduction noise. According to the present embodiment, the X capacitor 60 is disposed between the brushes in the circumferential direction. Thus, it is possible to dispose the X capacitor 60 in the position relatively close to the brush which is an electromagnetic noise generation source. This makes it possible to reduce the radiation noise attributable to the conduction noise. Furthermore, by disposing the X capacitor 60 between the brushes in the circumferential direction, it is possible to restrain the brush card 31 from being enlarged in the radial direction.

Since the common mode noise of the conduction noise conducts on the power source line and the housing 10, the conduction route of the common mode noise is longer than that of the normal mode noise. Thus, the radiation noise attributable to the common mode noise is larger than the radiation noise attributable to the normal mode noise.

In contrast, according to the present embodiment, the Y capacitors 61 and 62 for suppressing the common mode noise is positioned between the brushes in the circumferential direction. It is therefore possible to dispose the Y capacitors 61 and 62 in the positions relatively close to the brushes. This makes it possible to further reduce the common mode noise. As a result, it is possible to suppress the radiation noise attributable to the common mode noise. Furthermore, by disposing the Y capacitors 61 and 62 between the brushes in the circumferential direction, it is possible to restrain the brush card 31 from being enlarged in the radial direction.

The choke coils 63 and 64 are serially connected to the brushes 51a to 51d. It is possible to further reduce the electromagnetic noise generated by the spark of the brushes 51a to 51d. In the present embodiment, the choke coil 63 is connected to the negative-electrode-side wiring portion 72a. It is therefore possible to reduce the power source noise flowing from the power source.

As described above, the X capacitor 60 is directly connected to the brushes 51a to 51d. Therefore, as compared with a case where the X capacitor 60 and the brushes 51a to 51d are connected via, e.g., the choke coils 63 and 64, it is possible to shorten the route along which the conduction noise flows from the brushes 51a to 51d to the X capacitor 60. This makes it possible to further reduce the radiation noise attributable to the conduction noise.

Furthermore, the Y capacitors 61 and 62 are respectively connected to the brushes having the same polarity. Therefore, if four brushes are used as in the present embodiment, it is possible for the two Y capacitors to suppress the electromagnetic noise.

Similar to the ground portions 75 and 76, the ground portion 77 has a reference potential. In the present embodiment, the ground portion 77 is not connected to a circuit-constituting component and, therefore, is not included in the circuit. The Y capacitors 61 and 62 may be connected to the ground portion 77 rather than the ground portions 75 and 76.

As described above, if the coils 23 are wound in a concentrated winding method, it is easy to reduce the size of the motor 1 as compared with a case where the coils 23 are wound in a distributed winding method. However, if the coils 23 are wound in a concentrated winding method, the spark generated between the brushes 51a to 51d and the segments 25b of the commutator 25 tends to grow larger and the electromagnetic noise tends to increase as compared with a case where the coils 23 are wound in a distributed winding method. In contrast, according to the present embodiment, it is possible to suppress the electromagnetic noise. Thus, the size of the motor 1 can be reduced by winding the coils 23 in a concentrated winding method. Consequently, according to the present embodiment, it is possible to obtain a motor 1 having a structure capable of reducing the size of the motor 1 and suppressing the electromagnetic noise.

For example, if a motor mounted to a motor vehicle generates an electromagnetic noise, there is a possibility that the electromagnetic noise affects electronic devices mounted to the motor vehicle whereby the electronic devices are erroneously operated. In contrast, the motor 1 of the present embodiment is capable of reducing the electromagnetic noise. It is therefore possible to reduce the influence of the electromagnetic noise on the electronic devices mounted to the motor vehicle.

Since the internal space of a motor vehicle is limited, it is preferred that a motor mounted to a motor vehicle has a reduced size. According to the present embodiment, it is possible to reduce the size of the motor 1. This makes it possible to effectively use the internal space of a motor vehicle. As described above, the motor 1 of the present embodiment can be quite suitably used as a motor mounted to a motor vehicle.

Moreover, according to the present embodiment, it is possible to restrain the motor 1 from being damaged by water droplets. Furthermore, according to the present embodiment, it is easy to cool the motor 1 and it is possible to restrain the motor 1 from becoming hot. This makes it possible to restrain the respective components of the motor 1 from being damaged by heat. Since it is possible to restrain the motor 1 from being damaged by water droplets and heat, the motor 1 can be used for a long period of time.

According to the present embodiment, the provision of the aforementioned motor 1 makes it possible to obtain a fan 2 which is superior in reliability. If the motor 1 of the present embodiment is used as a motor for the fan 2, it is possible to further enhance the cooling effect of the motor 1 because the air easily passes through the interior of the motor 1.

If the fan 2 is an engine cooling fan, the fan 2 is disposed to be exposed to an engine room of a motor vehicle, for example. Therefore, it is highly likely that water droplets are infiltrated into the motor 1. According to the fan 2 of the present embodiment, even when water droplets are infiltrated into the motor 1, it is possible to restrain the motor 1 from being damaged. Therefore, if the fan 2 is used as an engine cooling fan, it is possible to greatly enhance the effects of the present embodiment.

In the present embodiment, it may be possible to employ the following configurations.

In the present embodiment, it may be possible to employ a configuration in which the brush card assembly 30 includes at least a pair of brushes having different polarities. That is to say, in the present embodiment, the brush card assembly 30 may be configured to include only one pair of brushes having different polarities or may be configured to include three or more pairs of brushes having different polarities.

Furthermore, in the present embodiment, it may be possible to employ a configuration in which the brush card assembly 30 includes at least one X capacitor 60. That is to say, in the present embodiment, it may be possible to employ a configuration in which the brush card assembly 30 includes two or more X capacitors 60. For example, if there are provided two X capacitors 60, the X capacitors 60 may be disposed between the brush 51*a* and the brush 51*d* in the circumferential direction and between the brush 51*b* and the brush 51*c* in the circumferential direction.

Furthermore, in the present embodiment, it may be possible to employ a configuration in which the brush card assembly 30 includes at least two Y capacitors 61 and 62. That is to say, in the present embodiment, it may be possible to employ a configuration in which the brush card assembly 30 includes three or more Y capacitors 61 and 62.

Figure 18:
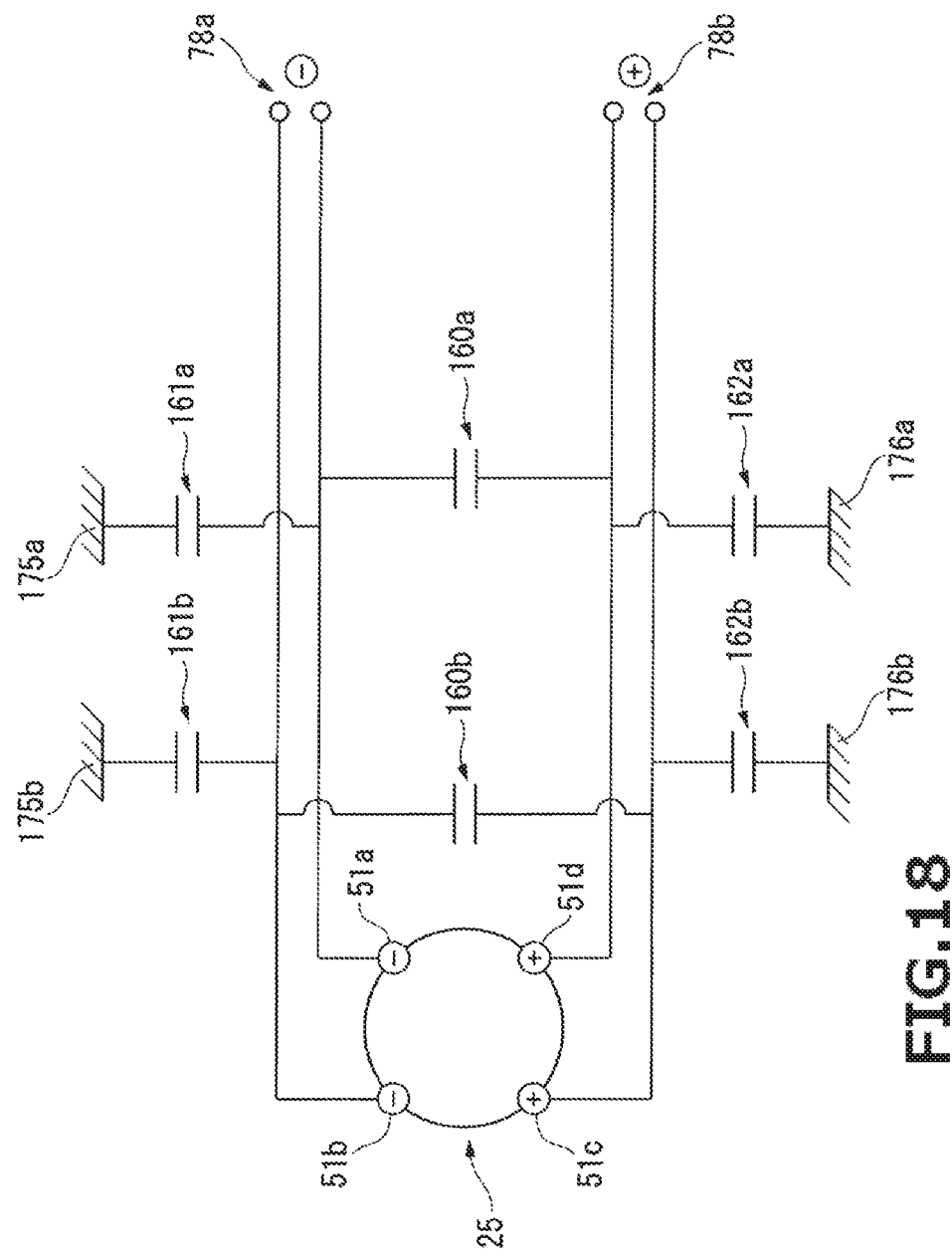
FIG. 18 is a circuit diagram illustrating another example of the circuit of the brush card assembly according to one embodiment.

In FIG. 18, there is illustrated another example of the circuit of the brush card assembly. In the example illustrated in FIG. 18, the brush card assembly preferably includes two X capacitors 160*a* and 160*b*, four Y capacitors 161*a*, 161*b*, 162*a* and 162*b*, and four ground portions 175*a*, 175*b*, 176*a* and 176*b*.

In the following descriptions, there may be a case where the same components as described above are designated by like reference symbols with the descriptions thereof omitted.

As illustrated in FIG. 18, the X capacitor 160*a* is parallel-connected to the brush 51*a* and the brush 51*d*. The Y capacitors 161*a* and 162*a* are parallel-connected to the brush 51*a* and the brush 51*d*. That is to say, the brushes 51*a* and 51*d* are respectively connected to one X capacitor 160*a* and two Y capacitors 161*a* and 162*a*. The Y capacitor 161*a* is connected to the ground portion 175*a*. The Y capacitor 162*a* is connected to the ground portion 176*a*.

The X capacitor 160*b* is parallel-connected to the brush 51*b* and the brush 51*c*. The Y capacitors 161*b* and 162*b* are parallel-connected to the brush 51*b* and the brush 51*c*. That is to say, the brushes 51*b* and 51*c* are respectively connected to one X capacitor 160*b* and two Y capacitors 161*b* and 162*b*. The Y capacitor 161*b* is connected to the ground portion 175*b*. The Y capacitor 162*b* is connected to the ground portion 176*b*.

Thus, the electromagnetic noise generated from the brush 51*a* and the brush 51*d* can be reduced by the X capacitor 160*a* and the Y capacitors 161*a* and 162*a*. The electromagnetic noise generated from the brush 51*b* and the brush 51*c* can be reduced by the X capacitor 160*b* and the Y capacitors 161*b* and 162*b*. As described above, according to the configuration illustrated in FIG. 18, one X capacitor and two Y capacitors are provided in each pair of the brushes. It is therefore possible to further reduce the electromagnetic noise generated from the brushes 51*a* to 51*d*.

While not shown in the drawings, in the example of the circuit illustrated in FIG. 18, for example, the X capacitor 160*a* is positioned between the brush 51*a* and the brush 51*d* in the circumferential direction and the X capacitor 160*b* is positioned between the brush 51*b* and the brush 51*c* in the circumferential direction. That is to say, one X capacitor is disposed between the brushes having different polarities in the circumferential direction. Thus, it is easy to connect the X capacitors 160*a* and 160*b* to different pairs of brushes. Furthermore, it is easy to dispose the X capacitors 160*a* and 160*b* because the X capacitors 160*a* and 160*b* are provided between different brushes in the circumferential direction.

The Y capacitors 161*a* and 161*b* are positioned, for example, between the brush 51*a* and the brush 51*b* in the circumferential direction. The Y capacitors 162*a* and 162*b* are positioned, for example, between the brush 51*c* and the brush 51*d* in the circumferential direction. By disposing the X capacitors 160*a* and 160*b* and the Y capacitors 161*a*, 161*b*, 162*a* and 162*b* between the brushes 51*a* to 51*d* in the circumferential direction as described above, it is possible to restrain the brush card assembly from being enlarged.

Other configurations of the X capacitors 160*a* and 160*b* are the same as the configurations of the X capacitor 60 described above. Other configurations of the Y capacitors 161*a* and 161*b* are the same as the configurations of the Y capacitor 61 described above. Other configurations of the Y capacitors 162*a* and 162*b* are the same as the configurations of the Y capacitor 62 described above. Other configurations of the ground portions 175*a* and 175*b* are the same as the configurations of the ground portion 75 described above. Other configurations of the ground portions 176*a* and 176*b* are the same as the configurations of the ground portion 76 described above.

In this configuration, for example, there may be provided only two ground portions as in the circuit illustrated in FIG. 17. In this case, for example, two Y capacitors 161*a* and 162*a* are connected to one ground portion. One ground portion is disposed, for example, between the two Y capacitors 161*a* and 162*a* in the circumferential direction. The circumferential distance from one ground portion to the Y capacitor 161*a* may be equal to, for example, the circumferential distance from one ground portion to the Y capacitor 162*a*. By disposing one ground portion and two Y capacitors 161*a* and 162*a* in this way, it is possible to shorten the conduction noise passing routes between the Y capacitors 161*a* and 162*a* and the ground portion. Accordingly, it is possible to reduce the radiation noise attributable to the conduction noise.

In the circuit illustrated in FIG. 18, the choke coils 63 and 64 are not provided. However, similar to the circuit illustrated in FIG. 17, there may be provided the choke coils 63 and 64.

In the present embodiment, it may be possible to employ a configuration in which at least one of the convex portion 75*c* and the concave portion 75*d* is provided in the contact portion 75*b*. That is to say, in the present embodiment, only one of the convex portion 75*c* and the concave portion 75*d* may be provided in the contact portion 75*b*.

Furthermore, in the present embodiment, it may be possible to employ a configuration in which at least one of the convex portion 75*c* and the concave portion 75*d* is provided in the radial outer end portion of the contact portion 75*b*. That is to say, in the present embodiment, only one of the convex portion 75*c* and the concave portion 75*d* may be provided in the radial outer end portion of the contact portion 75*b*.

Furthermore, in the present embodiment, the brush card 31 may be manufactured by caulking and fixing the plate portion 70 to a pre-molded resin portion.

The use of the fan 2 of the present embodiment described above is not particularly limited. The fan 2 may be used in other applications than engine cooling. In addition, the use of the motor 1 of the present embodiment described above is not particularly limited. The motor 1 may be used in other applications than the fan motor.

The respective configurations described above may be combined appropriately as long as no conflict arises.

Features of the above-described embodiments and the modifications thereof may be combined appropriately as long as no conflict arises.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
a rotor comprising a shaft concentric with a center axis extending in an axial direction;
a brush card assembly structured to supply an electric current to the rotor;
a housing structured to accommodate the rotor and the brush card assembly;
a permanent magnet fixed to an inner surface of the housing and positioned radially outward of the rotor; and
a bearing held by the housing and structured to support the shaft,
wherein the rotor comprises a core fixed to the shaft, a coil structured to excite the core and a commutator electrically connected to the coil,
the coil is wound around the core in a concentrated winding method,
the brush card assembly comprises a first pair of brushes comprising a first brush of a first polarity and a first brush of a second polarity and a second pair of brushes comprising a second brush of the first polarity and a second brush of the second polarity, the brushes disposed along a circumferential direction and electrically connected to each other via the commutator and the coil; at least one X capacitor parallel-connected to the brushes; at least two Y capacitors parallel-connected to the brushes; and a brush card structured to hold the brushes, the X capacitor and the Y capacitors,
the brush card comprises a ground portion comprising a reference potential,
the X capacitor is positioned between brushes having different polarities in the circumferential direction, and
the Y capacitors are electrically connected to the ground portion;
the Y capacitors are positioned between brushes having the same polarity in the circumferential direction;
the first pair of brushes are positioned 135 degrees apart in the circumferential direction;
the second pair of brushes are positioned 135 degrees apart in the circumferential direction;
the first brush of the first polarity and the second brush of the first polarity are positioned 90 degrees apart in the circumferential direction;
the first brush of the second polarity and the second brush of the second polarity are positioned 90 degrees apart in the circumferential direction;
the second brush of the first polarity and the first brush of the second polarity are positioned 45 degrees apart in the circumferential direction;
the first brush of the first polarity and the second brush of the second polarity are positioned 135 degrees apart in the circumferential direction;
the X capacitor is positioned in the 45 degrees between the second brush of the first polarity and the first brush of the second polarity in the circumferential direction;
a first terminal and a second terminal are provided in the 135 degrees between the first brush of the first polarity and the second brush of the second polarity in the circumferential direction;
the first terminal is electrically connected to the first brush of the first polarity and the second brush of the first polarity; and
the second terminal is electrically connected to the first brush of the second polarity and the second brush of the second polarity.

2. The motor of claim 1, wherein the brush card assembly comprises a choke coil serially connected to the brushes, and the X capacitor and the brushes are directly connected to each other.

3. The motor of claim 1, wherein the Y capacitors are connected to the brushes having the same polarity.

4. The motor of claim 1, wherein the brush card assembly comprises two X capacitors and four Y capacitors, one of the X capacitors is disposed between the brushes having different polarities in the circumferential direction, and each pair of the brushes is connected to one of the X capacitors and two of the Y capacitors.

5. The motor of claim 1, wherein the brush card comprises a plate portion structured to electrically interconnect the brushes, the X capacitor and the Y capacitors and a resin portion structured to hold the plate portion, the plate portion comprises a plate body portion and the ground portion connected to the plate body portion, and the ground portion is connected to the plate body portion at a radial inner side of an outer edge of the plate body portion.

6. The motor of claim 1, further comprising:
a connector portion to which an external power source is connected,
wherein when viewed in the axial direction, the brushes, the X capacitor, the Y capacitors and the ground portion are provided in line symmetry with respect to a line which interconnects the connector portion and the center axis.

7. A fan comprising:
the motor of claim 1; and
an impeller mounted to the shaft.

8. The motor of claim 1, wherein the housing comprises a back cover structured to hold the brush card assembly and a bracket positioned at one side of the back cover in the axial direction to hold the permanent magnet, the bracket and the back cover are fixed to each other by caulking, the ground portion comprises a contact portion arranged to make contact with the bracket and the back cover, and the contact portion is sandwiched by the bracket and the back cover in the axial direction.

9. The motor of claim 8, wherein a projection portion structured to make contact with the back cover is provided on a back cover side surface of the brush card, and the projection portion is positioned at the opposite side of the center axis from the ground portion.

10. The motor of claim 8, wherein the contact portion is provided with at least one of a convex portion bulging in the axial direction and a concave portion depressed in the axial direction.

11. The motor of claim 10, wherein at least one of the convex portion and the concave portion is provided in a radial outer end portion of the contact portion.

12. The motor of claim 1, further comprising:
a connector portion to which an external power source is connected,
wherein the housing comprises a tubular portion structured to surround a radial outer side of the rotor, the tubular portion is provided with a housing through-hole extending through the tubular portion in a radial direction, and the housing through-hole is positioned between the connector portion and the ground portion in the circumferential direction.

13. The motor of claim 12, wherein the ground portion is positioned at the opposite side of the center axis from the connector portion.

14. The motor of claim 12, wherein when viewed in the axial direction, the brushes are provided in line symmetry with respect to a line which interconnects the connector portion and the center axis, and the connector portion is provided in one of circumferential gaps between the brushes of the brush card where the circumferential distance between the brushes is largest.

15. The motor of claim 12, wherein the brush card is provided with a brush card through-hole extending through the brush card in the axial direction, and the brush card through-hole is positioned radially outward of the brushes.

16. The motor of claim 12, wherein the housing is provided with a groove extending from the connector portion to the housing through-hole along the circumferential direction.

17. The motor of claim 12, wherein the connector portion is provided in the brush card, the brush card comprises a plate portion structured to electrically interconnect the brushes, the X capacitor and the Y capacitors and a resin portion structured to hold the plate portion, the plate portion comprises a plate body portion and the ground portion connected to the plate body portion, the resin portion comprises a resin body portion structured to hold the plate body portion and a tubular portion extending from an outer edge of the resin body portion in the axial direction, the ground portion comprises an extension portion extending from the plate body portion in the axial direction and a contact portion connected to the extension portion and structured to make contact with the housing, and the tubular portion is structured to cover the extension portion.

18. The motor of claim 17, wherein the brush card is manufactured by an insert-molding method in which the plate portion is inserted into a mold.

19. The motor of claim 17, wherein the housing through-hole overlaps with the tubular portion in the radial direction.

* * * * *